US012564126B2

(12) United States Patent
Michael

(10) Patent No.: US 12,564,126 B2
(45) Date of Patent: Mar. 3, 2026

(54) LOCALIZED PRODUCT INJECTION SYSTEM FOR AN AGRICULTURAL SPRAYER

(71) Applicant: Raven Industries, Inc., Sioux Falls, SD (US)

(72) Inventor: Nicholas O. Michael, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 766 days.

(21) Appl. No.: 17/504,601

(22) Filed: Oct. 19, 2021

(65) Prior Publication Data

US 2022/0104427 A1    Apr. 7, 2022

Related U.S. Application Data

(63) Continuation of application No. 14/300,761, filed on Jun. 10, 2014, now Pat. No. 11,160,204.

(Continued)

(51) Int. Cl.
| | |
|---|---|
| *A01C 23/04* | (2006.01) |
| *A01M 7/00* | (2006.01) |
| *A01G 25/09* | (2006.01) |

(52) U.S. Cl.
CPC ........... *A01C 23/042* (2013.01); *A01M 7/006* (2013.01); *A01M 7/0071* (2013.01); *A01C 23/047* (2013.01); *A01G 25/09* (2013.01)

(58) Field of Classification Search
CPC ..... A01C 23/042; A01C 23/047; A01C 23/04; A01M 7/006; A01M 7/0071; A01M 7/0089; A01G 25/09
See application file for complete search history.

(56) References Cited

U.S. PATENT DOCUMENTS

| | | | |
|---|---|---|---|
| 1,582,986 A | 5/1926 | Frank | |
| 1,947,407 A | 2/1934 | Cornell, Jr. | |

(Continued)

FOREIGN PATENT DOCUMENTS

| | | |
|---|---|---|
| AU | 725448 | 10/2000 |
| AU | 2004219715 | 9/2004 |

(Continued)

OTHER PUBLICATIONS

English Translation of WO-2013001948-A1.*

(Continued)

*Primary Examiner* — Qingzhang Zhou
(74) *Attorney, Agent, or Firm* — Schwegman Lundberg & Woessner, P.A.

(57) ABSTRACT

A localized product injection system for use with a product dispensing system includes a product injection reservoir coupled with an injection header. One or more injection boom tubes are coupled with the injection head. A plurality of localized injection interfaces are configured for coupling at corresponding product dispensers of a plurality of product dispensers. The plurality of localized injection interfaces in communication with the one or more injection boom tubes. Each of the localized injection interfaces includes an interface valve and an injection port in communication with the interface valve. The injection port is configured for localized coupling and injection to the corresponding product dispenser. The plurality of localized injection interfaces maintains a controlled pressurized environment of an injection product to the plurality of product dispensers.

22 Claims, 10 Drawing Sheets

Related U.S. Application Data

(60) Provisional application No. 61/833,290, filed on Jun. 10, 2013.

(56) References Cited

U.S. PATENT DOCUMENTS

| | | | |
|---|---|---|---|
| 3,197,299 A | 7/1965 | Bosse et al. |
| 3,770,198 A | 11/1973 | Mihara |
| 3,955,795 A | 5/1976 | Neely |
| 4,283,010 A | 8/1981 | Arzi et al. |
| 4,398,605 A | 8/1983 | Conklin et al. |
| 4,530,463 A | 7/1985 | Hiniker et al. |
| 4,582,085 A | 4/1986 | Hafner et al. |
| 4,632,358 A | 12/1986 | Orth et al. |
| 4,803,626 A | 2/1989 | Bachman et al. |
| 4,970,973 A | 11/1990 | Lyle et al. |
| 5,134,961 A | 8/1992 | Giles et al. |
| 5,285,814 A | 2/1994 | Pettersson et al. |
| 5,310,113 A | 5/1994 | Cowgur |
| 5,337,959 A | 8/1994 | Boyd |
| 5,475,614 A | 12/1995 | Tofte et al. |
| 5,479,812 A | 1/1996 | Juntunen et al. |
| 5,496,100 A | 3/1996 | Schmid |
| 5,503,366 A | 4/1996 | Zabeck et al. |
| 5,520,333 A | 5/1996 | Tofte |
| 5,635,911 A | 6/1997 | Landers et al. |
| 5,649,687 A | 7/1997 | Rosas et al. |
| 5,653,389 A | 8/1997 | Henderson et al. |
| 5,703,554 A | 12/1997 | Polgar et al. |
| 5,704,546 A | 1/1998 | Henderson et al. |
| 5,772,114 A | 6/1998 | Hunter |
| 5,785,246 A | 7/1998 | King et al. |
| 5,801,948 A | 9/1998 | Wood et al. |
| 5,864,781 A | 1/1999 | White |
| 5,881,919 A | 3/1999 | Womac et al. |
| 5,883,383 A | 3/1999 | Dragne |
| 5,884,205 A | 3/1999 | Elmore et al. |
| 5,884,224 A | 3/1999 | McNabb et al. |
| 5,897,600 A | 4/1999 | Elmore et al. |
| 5,911,362 A | 6/1999 | Wood et al. |
| 5,913,915 A | 6/1999 | McQuinn |
| 5,919,242 A | 7/1999 | Greatline et al. |
| 5,924,371 A | 7/1999 | Flamme et al. |
| 5,931,882 A | 8/1999 | Fick et al. |
| 5,936,234 A | 8/1999 | Thomas et al. |
| 5,938,071 A | 8/1999 | Sauder |
| 5,941,303 A | 8/1999 | Gowan et al. |
| 5,967,066 A | 10/1999 | Giles et al. |
| 5,969,340 A | 10/1999 | Dragne et al. |
| 5,971,294 A | 10/1999 | Thompson et al. |
| 5,978,723 A | 11/1999 | Hale et al. |
| 6,009,354 A | 12/1999 | Flamme et al. |
| 6,012,996 A | 1/2000 | Lo |
| 6,029,907 A | 2/2000 | McKenzie |
| 6,070,538 A | 6/2000 | Flamme et al. |
| 6,070,539 A | 6/2000 | Flamme et al. |
| 6,079,340 A | 6/2000 | Flamme et al. |
| 6,086,042 A | 7/2000 | Scott et al. |
| 6,089,743 A | 7/2000 | Mcquinn et al. |
| 6,093,926 A | 7/2000 | Mertins et al. |
| 6,112,999 A | 9/2000 | Fingleton et al. |
| 6,122,581 A | 9/2000 | McQuinn |
| 6,145,455 A | 11/2000 | Gust et al. |
| 6,149,071 A | 11/2000 | Maccallummhor et al. |
| 6,189,466 B1 | 2/2001 | Sinclair et al. |
| 6,189,807 B1 | 2/2001 | Miller et al. |
| 6,196,473 B1 | 3/2001 | Beeren et al. |
| 6,199,000 B1 | 3/2001 | Keller et al. |
| 6,209,563 B1 | 4/2001 | Seid et al. |
| 6,216,614 B1 | 4/2001 | Wollenhaupt |
| 6,230,091 B1 | 5/2001 | McQuinn et al. |
| 6,236,924 B1 | 5/2001 | Motz et al. |
| 6,240,861 B1 | 6/2001 | Memory |
| 6,250,564 B1 | 6/2001 | Chahley |
| 6,269,757 B1 | 8/2001 | Kiest |
| 6,285,938 B1 | 9/2001 | Lang et al. |
| 6,305,583 B1 | 10/2001 | Ward et al. |
| 6,373,057 B1 | 4/2002 | Penfold |
| 6,486,761 B1 | 11/2002 | Czarnetzki et al. |
| 6,522,948 B1 | 2/2003 | Benneweis |
| 6,533,334 B1 | 3/2003 | Bonn |
| 6,584,920 B1 | 7/2003 | Cresswell |
| 6,598,944 B1 | 7/2003 | Wolff et al. |
| 6,606,542 B2 | 8/2003 | Hauwiller et al. |
| 6,661,514 B1 | 12/2003 | Tevs et al. |
| 6,666,384 B2 | 12/2003 | Prandi |
| 6,678,580 B2 | 1/2004 | Benneweis |
| 6,698,368 B2 | 3/2004 | Cresswell |
| 6,708,080 B2 | 3/2004 | Benneweis |
| 6,720,684 B2 | 4/2004 | Czimmek |
| 6,755,390 B2 | 6/2004 | Masuda et al. |
| 6,776,355 B2 | 8/2004 | Ringer et al. |
| 6,851,377 B2 | 2/2005 | Mayerle et al. |
| 6,853,276 B2 | 2/2005 | Smith |
| 6,877,675 B2 | 4/2005 | Benneweis |
| 6,877,717 B2 | 4/2005 | Collins et al. |
| 6,959,907 B2 | 11/2005 | Hironaka |
| 6,994,406 B1 | 2/2006 | Krawczyk et al. |
| 7,124,964 B2 | 10/2006 | Bui |
| 7,147,241 B2 | 12/2006 | Beaujot et al. |
| 7,152,540 B1 | 12/2006 | Sauder et al. |
| 7,156,322 B1 | 1/2007 | Heitzman et al. |
| 7,162,961 B2 | 1/2007 | Grimm |
| 7,195,027 B2 | 3/2007 | Goossens et al. |
| 7,243,899 B2 | 7/2007 | Acar et al. |
| 7,311,004 B2 | 12/2007 | Giles |
| 7,347,221 B2 | 3/2008 | Berger et al. |
| 7,395,769 B2 | 7/2008 | Jensen |
| 7,441,746 B2 | 10/2008 | Sugiyama |
| 7,472,660 B2 | 1/2009 | Mariman et al. |
| 7,478,603 B2 | 1/2009 | Riewerts et al. |
| 7,490,564 B2 | 2/2009 | Allan et al. |
| 7,502,665 B2 | 3/2009 | Giles et al. |
| 7,626,288 B2 | 12/2009 | Protze |
| 7,654,473 B2 | 2/2010 | Hibberd |
| 7,685,951 B2 | 3/2010 | Beaujot et al. |
| 7,690,440 B2 | 4/2010 | Dean et al. |
| 7,694,638 B1 | 4/2010 | Rlewerts et al. |
| 7,706,926 B2 | 4/2010 | Peterson |
| 7,742,842 B2 | 6/2010 | Giles et al. |
| 7,789,321 B2 | 9/2010 | Hitt |
| 7,826,930 B2 | 11/2010 | Giles et al. |
| 7,848,865 B2 | 12/2010 | Di Federico et al. |
| 7,917,249 B2 | 3/2011 | Jacobsen et al. |
| 7,954,731 B2 | 6/2011 | Antonucci et al. |
| 8,078,367 B2 | 12/2011 | Sauder et al. |
| 8,109,448 B2 | 2/2012 | Giles |
| 8,141,504 B2 | 3/2012 | Dean et al. |
| 8,170,825 B2 | 5/2012 | Beaujot et al. |
| 8,186,288 B2 | 5/2012 | Chinkiwsky |
| 8,191,795 B2 | 6/2012 | Grimm et al. |
| 8,191,798 B2 | 6/2012 | Hahn et al. |
| 8,196,534 B2 | 6/2012 | Meyer et al. |
| 8,246,004 B2 | 8/2012 | Kratzer |
| 8,401,704 B2 | 3/2013 | Pollock et al. |
| 8,488,874 B2 | 7/2013 | Zaman et al. |
| 8,523,085 B2 | 9/2013 | Grimm et al. |
| 8,590,859 B2 | 11/2013 | Kurz |
| 8,634,993 B2 | 1/2014 | McClure |
| 8,635,963 B2 | 1/2014 | Friggstad |
| 8,701,707 B2 | 4/2014 | Moosmann et al. |
| 8,733,257 B2 | 5/2014 | Beaujot et al. |
| 8,733,259 B2 | 5/2014 | Beaujot |
| 8,739,830 B2 | 6/2014 | Bradbury et al. |
| 8,825,310 B2 | 9/2014 | Kowalchuk |
| 8,844,838 B2 | 9/2014 | Funseth et al. |
| 8,868,300 B2 | 10/2014 | Kocer et al. |
| 8,915,200 B2 | 12/2014 | Barsi et al. |
| 8,919,676 B2 | 12/2014 | Funseth et al. |
| 9,052,031 B2 | 6/2015 | Leidig |
| 9,061,296 B2 | 6/2015 | Peterson |
| 9,073,070 B2 | 7/2015 | Funseth et al. |
| 9,080,684 B2 | 7/2015 | Stahr |
| 9,113,591 B2 | 8/2015 | Shivak |
| 9,144,190 B2 | 9/2015 | Henry et al. |

(56)            References Cited

U.S. PATENT DOCUMENTS

| | | | |
|---|---|---|---|
| 9,266,124 | B2 | 2/2016 | Humpal |
| 9,453,585 | B2 | 9/2016 | Sato et al. |
| 9,470,332 | B2 | 10/2016 | Miura |
| 9,504,212 | B2 | 11/2016 | Michael et al. |
| 9,506,578 | B2 | 11/2016 | Lee |
| 9,702,475 | B2 | 7/2017 | Scheffel et al. |
| 9,781,916 | B2 | 10/2017 | Preheim et al. |
| 9,894,829 | B2 | 2/2018 | Shivak |
| 10,058,879 | B2 | 8/2018 | Needham |
| 10,173,236 | B2 | 1/2019 | Preheim et al. |
| 10,189,031 | B2 | 1/2019 | Funseth et al. |
| 10,368,538 | B2 | 8/2019 | Preheim et al. |
| 10,518,284 | B2 | 12/2019 | Thurow et al. |
| 10,568,257 | B2 | 2/2020 | Shivak |
| 10,799,898 | B2 | 10/2020 | Posselius et al. |
| 10,821,460 | B2 | 11/2020 | Batcheller et al. |
| 11,051,505 | B2 | 7/2021 | Humpal et al. |
| 11,071,247 | B2 | 7/2021 | Shivak et al. |
| 11,134,668 | B2 | 10/2021 | Preheim et al. |
| 11,160,204 | B2 | 11/2021 | Michael |
| 11,944,030 | B2 | 4/2024 | Shivak et al. |
| 12,016,326 | B2 | 6/2024 | Kocer et al. |
| 2002/0030119 | A1 | 3/2002 | Proharam |
| 2002/0107609 | A1 | 8/2002 | Benneweis |
| 2003/0028321 | A1 | 2/2003 | Upadhyaya et al. |
| 2003/0070597 | A1 | 4/2003 | Cresswell |
| 2003/0234301 | A1 | 12/2003 | Swan |
| 2004/0036048 | A1 | 2/2004 | Petersen |
| 2004/0104370 | A1 | 6/2004 | Suzuki |
| 2004/0128045 | A1 | 7/2004 | Benneweis |
| 2005/0000277 | A1 | 1/2005 | Giles |
| 2005/0048196 | A1 | 3/2005 | Yanagita et al. |
| 2005/0051749 | A1 | 3/2005 | Lee |
| 2005/0076818 | A1 | 4/2005 | Grimm |
| 2005/0092951 | A1 | 5/2005 | Groetzinger |
| 2005/0125083 | A1 | 6/2005 | Kiko |
| 2005/0173979 | A1 | 8/2005 | Voss |
| 2006/0086295 | A1 | 4/2006 | Jensen |
| 2006/0097210 | A1 | 5/2006 | Fong et al. |
| 2006/0237562 | A1 | 10/2006 | Hedegard |
| 2006/0265106 | A1 | 11/2006 | Giles et al. |
| 2006/0273189 | A1 | 12/2006 | Grimm et al. |
| 2007/0039880 | A1 | 2/2007 | Mayerle |
| 2008/0110476 | A1 | 5/2008 | Amestoy et al. |
| 2008/0114497 | A1 | 5/2008 | Gilles et al. |
| 2008/0114498 | A1 | 5/2008 | Giles |
| 2008/0147282 | A1 | 6/2008 | Kormann |
| 2008/0163807 | A1 | 7/2008 | Dean et al. |
| 2008/0283633 | A1 | 11/2008 | Nozaki et al. |
| 2008/0296398 | A1 | 12/2008 | Hickman et al. |
| 2009/0078178 | A1 | 3/2009 | Beaujot |
| 2009/0101371 | A1 | 4/2009 | Melanson et al. |
| 2009/0112372 | A1 | 4/2009 | Peterson |
| 2009/0114210 | A1 | 5/2009 | Guice et al. |
| 2009/0134237 | A1 | 5/2009 | Giles |
| 2009/0184182 | A1 | 7/2009 | Beeren |
| 2009/0271136 | A1 | 10/2009 | Beaujot et al. |
| 2010/0032492 | A1 | 2/2010 | Grimm et al. |
| 2010/0096476 | A1 | 4/2010 | Callies et al. |
| 2010/0101469 | A1 | 4/2010 | Landphair et al. |
| 2010/0132600 | A1 | 6/2010 | Dean et al. |
| 2010/0269921 | A1 | 10/2010 | Pifer et al. |
| 2011/0054743 | A1 | 3/2011 | Kocer et al. |
| 2011/0160920 | A1 | 6/2011 | Orr et al. |
| 2011/0179984 | A1 | 7/2011 | Beaujot et al. |
| 2011/0204272 | A1 | 8/2011 | Kratzer |
| 2011/0210186 | A1 | 9/2011 | Kugler et al. |
| 2012/0045013 | A1 | 2/2012 | Chen et al. |
| 2012/0080624 | A1 | 4/2012 | Stahr et al. |
| 2012/0153051 | A1 | 6/2012 | Kah, Jr. et al. |
| 2012/0168530 | A1 | 7/2012 | Ellingson et al. |
| 2012/0169495 | A1 | 7/2012 | Kowalchuk |
| 2012/0174843 | A1 | 7/2012 | Friggstad |
| 2012/0195496 | A1 | 8/2012 | Zaman et al. |
| 2012/0211508 | A1 | 8/2012 | Barsi et al. |
| 2012/0216732 | A1 | 8/2012 | Ballard et al. |
| 2012/0228395 | A1 | 9/2012 | Needham |
| 2012/0241533 | A1 | 9/2012 | Moeller et al. |
| 2012/0271467 | A1 | 10/2012 | Grimm et al. |
| 2013/0032737 | A1 | 2/2013 | Neilson et al. |
| 2013/0037633 | A1 | 2/2013 | Walter et al. |
| 2013/0092746 | A1 | 4/2013 | Scott et al. |
| 2013/0119154 | A1 | 5/2013 | Sawyer |
| 2013/0192503 | A1 | 8/2013 | Henry et al. |
| 2013/0269578 | A1 | 10/2013 | Grimm |
| 2013/0292590 | A1 | 11/2013 | Stahr |
| 2013/0306894 | A1 | 11/2013 | Weis et al. |
| 2013/0320106 | A1 | 12/2013 | Schmidt |
| 2013/0333601 | A1 | 12/2013 | Shivak |
| 2014/0014863 | A1 | 1/2014 | Najmolhoda et al. |
| 2014/0026995 | A1 | 1/2014 | Mayr et al. |
| 2014/0048002 | A1 | 2/2014 | Grimm et al. |
| 2014/0084196 | A1 | 3/2014 | Heyer et al. |
| 2014/0091243 | A1 | 4/2014 | Leidig |
| 2014/0216315 | A1 | 8/2014 | Beaujot et al. |
| 2014/0263705 | A1 | 9/2014 | Michael et al. |
| 2014/0263708 | A1 | 9/2014 | Thompson et al. |
| 2014/0263709 | A1 | 9/2014 | Kocer et al. |
| 2014/0277780 | A1 | 9/2014 | Jensen et al. |
| 2014/0299673 | A1 | 10/2014 | Grimm et al. |
| 2014/0312141 | A1 | 10/2014 | Ravishankar |
| 2014/0333398 | A1 | 11/2014 | Nila et al. |
| 2014/0361094 | A1 | 12/2014 | Michael |
| 2015/0115058 | A1 | 4/2015 | Wilger |
| 2015/0257331 | A1 | 9/2015 | Shivak |
| 2015/0367352 | A1 | 12/2015 | Burchardt |
| 2015/0367357 | A1 | 12/2015 | Humpal et al. |
| 2015/0367358 | A1 | 12/2015 | Funseth et al. |
| 2015/0375247 | A1 | 12/2015 | Funseth et al. |
| 2016/0015020 | A1 | 1/2016 | Needham et al. |
| 2016/0017792 | A1 | 1/2016 | Fletcher et al. |
| 2016/0044862 | A1 | 2/2016 | Kocer et al. |
| 2016/0084382 | A1 | 3/2016 | Pisasale |
| 2016/0136671 | A1 | 5/2016 | Kocer |
| 2016/0175869 | A1 | 6/2016 | Sullivan et al. |
| 2016/0178422 | A1 | 6/2016 | Humpal et al. |
| 2016/0227755 | A1 | 8/2016 | Preheim et al. |
| 2016/0251008 | A1 | 9/2016 | Jeon et al. |
| 2017/0018345 | A1 | 1/2017 | Raff et al. |
| 2017/0050206 | A1 | 2/2017 | Bullock et al. |
| 2017/0079200 | A1 | 3/2017 | Posselius et al. |
| 2017/0120263 | A1 | 5/2017 | Needham |
| 2017/0284285 | A1 | 10/2017 | Lenk et al. |
| 2017/0314580 | A1 | 11/2017 | Steensma et al. |
| 2017/0348718 | A1 | 12/2017 | Preheim et al. |
| 2018/0042214 | A1 | 2/2018 | Preheim et al. |
| 2018/0111148 | A1 | 4/2018 | Batcheller et al. |
| 2018/0288934 | A1 | 10/2018 | Shivak |
| 2019/0029170 | A1 | 1/2019 | Wilger |
| 2019/0350187 | A1 | 11/2019 | Kocer et al. |
| 2019/0373880 | A1 | 12/2019 | Kocer et al. |
| 2020/0107538 | A1 | 4/2020 | Preheim et al. |
| 2020/0113170 | A1 | 4/2020 | Davis et al. |
| 2020/0113171 | A1 | 4/2020 | Davis et al. |
| 2020/0214193 | A1 | 7/2020 | Shivak |
| 2020/0253111 | A1 | 8/2020 | Schlipf et al. |
| 2021/0076977 | A1 | 3/2021 | Abeyratne et al. |
| 2021/0102637 | A1 | 4/2021 | Krosschell et al. |
| 2021/0144906 | A1 | 5/2021 | Shivak et al. |
| 2021/0176977 | A1 | 6/2021 | Bremer et al. |
| 2021/0289693 | A1 | 9/2021 | Harmon et al. |
| 2023/0049963 | A1 | 2/2023 | Kocer et al. |
| 2023/0141050 | A1 | 5/2023 | Sibley et al. |

FOREIGN PATENT DOCUMENTS

| | | | |
|---|---|---|---|
| AU | 2005247004 | | 12/2006 |
| AU | 2006202376 | B2 | 12/2006 |
| AU | 2009203181 | A1 | 2/2010 |
| AU | 2012201357 | A1 | 9/2012 |
| AU | 2013203361 | A1 | 10/2013 |
| AU | 2013204455 | A1 | 3/2014 |
| AU | 2013248190 | | 5/2014 |
| AU | 2013277513 | B2 | 3/2017 |

(56) References Cited

FOREIGN PATENT DOCUMENTS

| | | | |
|---|---|---|---|
| AU | 2017285727 B2 | 7/2020 | |
| AU | 2021209314 | 8/2023 | |
| CA | 2229852 A1 | 8/1998 | |
| CA | 2517031 A1 | 9/2004 | |
| CA | 2528708 A1 | 11/2006 | |
| CA | 2549300 A1 | 12/2006 | |
| CA | 2674527 A1 | 2/2010 | |
| CA | 2770013 A1 | 9/2012 | |
| CA | 2811726 A1 | 10/2013 | |
| CA | 2813949 A1 | 2/2014 | |
| CA | 2830306 | 4/2014 | |
| CA | 3049421 | 3/2023 | |
| CN | 102435019 A | 5/2012 | |
| CN | 202255911 U | 5/2012 | |
| CN | 102266829 B | 12/2012 | |
| CN | 203264929 U | 11/2013 | |
| DE | 102011053182 | 3/2013 | |
| EP | 0576121 B1 | 3/1996 | |
| EP | 969712 | 1/2000 | |
| EP | 0963255 B1 | 10/2002 | |
| EP | 0847307 B2 | 1/2003 | |
| EP | 1426112 B1 | 6/2011 | |
| EP | 3565398 B1 | 6/2024 | |
| FR | 2964047 A1 | 3/2012 | |
| GB | 990346 A | 4/1965 | |
| GB | 2322573 A | 9/1998 | |
| JP | 2759711 B2 | 5/1998 | |
| JP | 2000139245 A | 5/2000 | |
| JP | 2005161221 A | 6/2005 | |
| JP | 2010127694 | 6/2010 | |
| SU | 1285443 A1 * | 1/1987 | |
| WO | WO-97/12688 A1 | 4/1997 | |
| WO | WO-98037751 | 9/1998 | |
| WO | WO-9842178 A1 | 10/1998 | |
| WO | WO-99/016007 A1 | 4/1999 | |
| WO | WO-9916007 A1 | 4/1999 | |
| WO | WO-2004023865 | 3/2004 | |
| WO | WO-2004081499 | 9/2004 | |
| WO | WO-2005048704 A2 | 6/2005 | |
| WO | WO-2005090979 A1 * | 9/2005 | ....... G01N 33/54366 |
| WO | WO-2008059984 A1 | 5/2008 | |
| WO | WO-2008112930 A1 | 9/2008 | |
| WO | WO-2010105221 A1 | 9/2010 | |
| WO | WO-2012022903 A1 | 2/2012 | |
| WO | WO-2013001948 A1 * | 1/2013 | .......... A01C 23/042 |
| WO | WO-2013/135430 A1 | 9/2013 | |
| WO | WO-2013/191990 A3 | 12/2013 | |
| WO | WO-2013191990 A2 | 12/2013 | |
| WO | WO-2014/210043 A1 | 12/2014 | |
| WO | WO-2014201008 A1 | 12/2014 | |
| WO | WO-2015/058091 A1 | 4/2015 | |
| WO | WO-2016145081 A2 | 9/2016 | |
| WO | WO-2017124175 A1 | 7/2017 | |
| WO | WO-2017192625 A1 | 11/2017 | |
| WO | WO-2017/223252 A1 | 12/2017 | |
| WO | WO-2018129323 A1 | 7/2018 | |
| WO | WO-2018129376 A2 | 7/2018 | |
| WO | WO-2018129376 A3 | 7/2018 | |
| WO | WO-2021/066962 A1 | 4/2021 | |

OTHER PUBLICATIONS

"U.S. Appl. No. 13/776,285, Amendment and Response under 37 C.F.R. Sec. 1.114 filed Apr. 27, 2015", 13 pgs.

"U.S. Appl. No. 13/776,285, Non Final Office Action mailed Jul. 30, 2014", 15 pgs.

"U.S. Appl. No. 13/776,285, Notice of Allowance mailed Jan. 27, 2015", 5 pgs.

"U.S. Appl. No. 13/776,285, Notice of Allowance mailed May 4, 2015", 6 pgs.

"U.S. Appl. No. 13/776,285, Response filed Dec. 30, 2014 to Non Final Office Action mailed Jul. 30, 2014", 25 pgs.

"U.S. Appl. No. 13/832,678, Advisory Action mailed Jun. 3, 2016", 3 pgs.

"U.S. Appl. No. 13/832,678, Final Office Action mailed Mar. 17, 2016", 12 pgs.

"U.S. Appl. No. 13/832,678, Non Final Office Action mailed Oct. 1, 2015", 15 pgs.

"U.S. Appl. No. 13/832,678, Notice of Allowance mailed Jul. 20, 2016", 13 pgs.

"U.S. Appl. No. 13/832,678, Response filed May 12, 2016 to Final Office Action mailed Mar. 17, 2016", 10 pgs.

"U.S. Appl. No. 13/832,678, Response filed Jul. 27, 2015 to Restriction Requirement mailed Jun. 9, 2015", 7 pgs.

"U.S. Appl. No. 13/832,678, Response filed Dec. 31, 2015 to Non Final Office Action mailed Oct. 1, 2015", 10 pgs.

"U.S. Appl. No. 13/832,678, Restriction Requirement mailed Jun. 9, 2015", 7 pgs.

"U.S. Appl. No. 14/300,761, Advisory Action mailed Dec. 12, 2017", 3 pgs.

"U.S. Appl. No. 14/300,761, Examiner Interview Summary mailed Nov. 22, 2017", 3 pgs.

"U.S. Appl. No. 14/300,761, Final Office Action mailed Aug. 31, 2017", 11 pgs.

"U.S. Appl. No. 14/300,761, Final Office Action mailed Nov. 27, 2018", 16 pgs.

"U.S. Appl. No. 14/300,761, Final Office Action mailed Dec. 18, 2020", 14 pgs.

"U.S. Appl. No. 14/300,761, Non Final Office Action mailed Feb. 8, 2017", 13 pgs.

"U.S. Appl. No. 14/300,761, Non Final Office Action mailed Apr. 15, 2020", 17 pgs.

"U.S. Appl. No. 14/300,761, Non Final Office Action mailed May 24, 2018", 16 pgs.

"U.S. Appl. No. 14/300,761, Notice of Allowance mailed May 7, 2021", 16 pgs.

"U.S. Appl. No. 14/300,761, Notice of Allowance mailed Sep. 9, 2021", 16 pgs.

"U.S. Appl. No. 14/300,761, Response filed Apr. 19, 2021 to Final Office Action mailed Dec. 18, 2020", 19 pgs.

"U.S. Appl. No. 14/300,761, Response filed Jun. 7, 2017 to Non Final Office Action mailed Feb. 8, 2017", 16 pgs.

"U.S. Appl. No. 14/300,761, Response filed Oct. 15, 2020 to Non Final Office Action mailed Apr. 15, 2020", 17 pgs.

"U.S. Appl. No. 14/300,761, Response filed Oct. 24, 2018 to Non Final Office Action mailed May 24, 2018", 22 pgs.

"U.S. Appl. No. 14/300,761, Response filed Nov. 29, 2019 to Final Office Action mailed Nov. 27, 2018", 21 pgs.

"U.S. Appl. No. 14/300,761, Response filed Dec. 20, 2016 to Restriction Requirement mailed Oct. 20, 2016", 15 pgs.

"U.S. Appl. No. 14/300,761, Resposne filed Nov. 16, 2017 to Final Office Action mailed Aug. 31, 2017", 16 pgs.

"U.S. Appl. No. 14/300,761, Restriction Requirement mailed Oct. 20, 2016", (9 pgs).

"U.S. Appl. No. 14/727,535, Corrected Notice of Allowance mailed Jan. 12, 2018", 2 pgs.

"U.S. Appl. No. 14/727,535, Final Office Action mailed Jun. 21, 2017", 6 pgs.

"U.S. Appl. No. 14/727,535, Non Final Office Action mailed Feb. 16, 2017", 17 pgs.

"U.S. Appl. No. 14/727,535, Notice of Allowance mailed Aug. 24, 2017", 5 pgs.

"U.S. Appl. No. 14/727,535, Preliminary Amendment filed Jun. 2, 2015", 9 pgs.

"U.S. Appl. No. 14/727,535, Response filed Jan. 17, 2017 to Restriction Requirement mailed Nov. 17, 2016", 12 pgs.

"U.S. Appl. No. 14/727,535, Response filed May 6, 2017 to Non Final Office Action mailed Feb. 16, 2017", 18 pgs.

"U.S. Appl. No. 14/727,535, Response filed Aug. 14, 2017 to Final Office Action mailed Jun. 21, 2017", 9 pgs.

"U.S. Appl. No. 14/727,535, Restriction Requirement mailed Nov. 17, 2016", 6 pgs.

"U.S. Appl. No. 15/585,034, Non Final Office Action mailed Nov. 2, 2018", 25 pgs.

"U.S. Appl. No. 15/821,113, Ex Parte Quayle Action mailed Aug. 9, 2019", 4 pgs.

(56) References Cited

OTHER PUBLICATIONS

"U.S. Appl. No. 15/821,113, Notice of Allowance mailed Sep. 27, 2019", 5 pgs.
"U.S. Appl. No. 15/821,113, Notice of Allowance mailed Oct. 22, 2019", 5 pgs.
"U.S. Appl. No. 15/821,113, Notice of Non-Compliant Amendment mailed Jun. 11, 2019", 4 pgs.
"U.S. Appl. No. 15/821,113, Preliminary Amendment filed Jun. 28, 2018", 7 pgs.
"U.S. Appl. No. 15/821,113, Response filed Apr. 29, 2019 to Restriction Requirement mailed Nov. 30, 2018", 10 pgs.
"U.S. Appl. No. 15/821,113, Response filed Jul. 11, 2019 to Notice of Non-Compliant Amendment mailed Jun. 11, 2019", 12 pgs.
"U.S. Appl. No. 15/821,113, Response filed Sep. 9, 2019 to Ex Parte Quayle Action mailed, Aug. 9, 2019", 3 pgs.
"U.S. Appl. No. 15/821,113, Restriction Requirement mailed Nov. 30, 2018", 6 pgs.
"U.S. Appl. No. 16/476,016, Non Final Office Action mailed Aug. 31, 2021", 14 pgs.
"U.S. Appl. No. 16/476,016, Preliminary Amendment filed Jul. 3, 2019", 12 pgs.
"U.S. Appl. No. 16/476,016, Response filed Jul. 28, 2021 to Restriction Requirement mailed Apr. 30, 2021", 12 pgs.
"U.S. Appl. No. 16/476,016, Restriction Requirement mailed Apr. 30, 2021", 8 pgs.
"U.S. Appl. No. 16/731,325, Corrected Notice of Allowability mailed Jun. 15, 2021", 2 pgs.
"U.S. Appl. No. 16/731,325, Ex Parte Quayle Action mailed Oct. 22, 2020", 5 pgs.
"U.S. Appl. No. 16/731,325, Examiner Interview Summary mailed Oct. 23, 2020", 2 pgs.
"U.S. Appl. No. 16/731,325, Notice of Allowance mailed Feb. 18, 2021", 8 pgs.
"U.S. Appl. No. 16/731,325, Notice of Allowance mailed Mar. 23, 2021", 5 pgs.
"U.S. Appl. No. 16/731,325, Notice of Allowance mailed Dec. 7, 2020", 5 pgs.
"U.S. Appl. No. 16/731,325, Preliminary Amendment filed Mar. 24, 2020", 8 pgs.
"U.S. Appl. No. 16/731,325, Response filed Nov. 20, 2020 to Ex Parte Quayle Action mailed Oct. 22, 2020", 10 pgs.
"U.S. Appl. No. 17/161,453, Preliminary Amendment filed Jan. 28, 2021", 8 pgs.
"Australian Application Serial No. 2013277513, First Examiners Report mailed Jul. 26, 2016", 3 pgs.
"Australian Application Serial No. 2013277513, Notice of Acceptance mailed Nov. 8, 2016", 2 pgs.
"Australian Application Serial No. 2013277513, Response filed Oct. 28, 2016 to First Examiners Report mailed Jul. 26, 2016", 20 pgs.
"Australian Application Serial No. 2014278310, First Examiners Report mailed on Jul. 28, 2017", 5 pgs.
"Australian Application Serial No. 2018205225, First Examination Report mailed Apr. 15, 2020", 18 pgs.
"Australian Application Serial No. 2018205225, Response filed Jan. 19, 2021 to First Examination Report mailed Apr. 15, 2020", 14 pgs.
"Australian Application Serial No. 2018205225, Response filed Apr. 13, 2021 to Subsequent Examiners Report mailed Feb. 11, 2021", 24 pgs.
"Australian Application Serial No. 2018205225, Subsequent Examiners Report mailed Feb. 11, 2021", 6 pgs.
"Canadian Application Serial No. 2,877,195, Office Action mailed Jun. 18, 2019", 3 pgs.
"Canadian Application Serial No. 3,049,391, Office Action mailed Sep. 4, 2020", 4 pgs.
"Canadian Application Serial No. 3,049,391, Response filed Mar. 3, 2021 to Office Action mailed Sep. 4, 2020", 11 pgs.
"Canadian Application Serial No. 3,049,421, Office Action mailed Jun. 4, 2021", 3 pgs.

"Canadian Application Serial No. 3,049,421, Office Action mailed Nov. 5, 2020", 3 pgs.
"Canadian Application Serial No. 3,049,421, Response filed Mar. 1, 2021 to Office Action mailed Nov. 5, 2020", 19 pgs.
"European Application Serial No. 13807150.1, Communication Pursuant to Article 94(3) EPC mailed Nov. 8, 2017", 5 pgs.
"European Application Serial No. 13807150.1, Extended European Search Report mailed Jan. 8, 2016", 8 pgs.
"European Application Serial No. 13807150.1, Office Action mailed Jan. 26, 2016", 1 pg.
"European Application Serial No. 13807150.1, Office Action mailed Feb. 3, 2015", 3 pgs.
"European Application Serial No. 13807150.1, Response filed Aug. 3, 2015 to Office Action mailed Feb. 3, 2015", 10 pgs.
"European Application Serial No. 13807150.1, Response filed Aug. 5, 2016 to Office Action mailed Jan. 26, 2016", 14 pgs.
"European Application Serial No. 18735853.6, Communication Pursuant to Article 94(3) EPC mailed Jun. 18, 2021", 4 pgs.
"European Application Serial No. 18735853.6, Extended European Search Report mailed Jun. 16, 2020", 8 pgs.
"European Application Serial No. 18735853.6, Response filed Jan. 11, 2021 to Extended European Search Report mailed Jun. 16, 2020", 16 pgs.
"European Application Serial No. 18735853.6, Response filed Feb. 24, 2020 to Communiciation pursuant to Rules 161(2) and 162 EPC mailed Aug. 13, 2019", 16 pgs.
"European Application Serial No. 18736496.3, Extended European Search Report mailed Sep. 15, 2020", 9 pgs.
"European Application Serial No. 18736496.3, Response filed Apr. 12, 2021 to Extended European Search Report mailed Sep. 15, 2020", 31 pgs.
"European Application Serial No. 18736496.3, Response to Communication Pursuant to Rules 161(2) and 162 EPC filed Feb. 28, 2020", 14 pgs.
"International Application Serial No. PCT/US2013/045445, International Preliminary Report on Patentability mailed Dec. 31, 2014", 7 pgs.
"International Application Serial No. PCT/US2013/045445, International Search Report mailed Nov. 27, 2013", 3 pgs.
"International Application Serial No. PCT/US2013/045445, Written Opinion mailed Nov. 27, 2013", 9 pgs.
"International Application Serial No. PCT/US2014/041717, International Preliminary Report on Patentability mailed May 6, 2015", 11 pgs.
"International Application Serial No. PCT/US2014/041717, International Search Report mailed Oct. 15, 2014", 2 pgs.
"International Application Serial No. PCT/US2014/041717, Response and Amendment filed Apr. 5, 2015 to Written Opinion mailed Oct. 15, 2014", 15 pgs.
"International Application Serial No. PCT/US2014/041717, Written Opinion mailed Oct. 15, 2014", 7 pgs.
"International Application Serial No. PCT/US2017/030694, International Preliminary Report on Patentability mailed May 29, 2018", 23 pgs.
"International Application Serial No. PCT/US2017/030694, International Search Report mailed Aug. 1, 2017", 3 pgs.
"International Application Serial No. PCT/US2017/030694, Response filed Mar. 2, 2018 to Written Opinion mailed Aug. 1, 2017", 4 pgs.
"International Application Serial No. PCT/US2017/030694, Written Opinion mailed Aug. 1, 2017", 8 pgs.
"International Application Serial No. PCT/US2018/012590, International Preliminary Report on Patentability mailed Jul. 18, 2019", 15 pgs.
"International Application Serial No. PCT/US2018/012590, International Search Report mailed Apr. 13, 2018", 4 pgs.
"International Application Serial No. PCT/US2018/012590, Invitation to Pay Additional Fees and Partial Search Report mailed Feb. 21, 2018", 2 pgs.
"International Application Serial No. PCT/US2018/012590, Written Opinion mailed Apr. 13, 2018", 13 pgs.
"International Application Serial No. PCT/US2018/012661, International Preliminary Report on Patentability mailed Jul. 18, 2019", 11 pgs.

(56)        References Cited

OTHER PUBLICATIONS

"International Application Serial No. PCT/US2018/012661, International Search Report mailed Jun. 21, 2018", 4 pgs.

"International Application Serial No. PCT/US2018/012661, Invitation to Pay Additional Fees and Partial Search Report mailed Mar. 15, 2018", 2 pgs.

"International Application Serial No. PCT/US2018/012661, Written Opinion mailed Jun. 21, 2018", 9 pgs.

"U.S. Appl. No. 16/476,016, Corrected Notice of Allowability mailed Mar. 13, 2024", 2 pgs.

"U.S. Appl. No. 16/476,016, Corrected Notice of Allowability mailed Apr. 16, 2024", 2 pgs.

"U.S. Appl. No. 17/809,223, Response filed Apr. 19, 2024 to Non Final Office Action mailed Jan. 19, 2024", 19 pgs.

"Canadian Application Serial No. 3,185,961, Examiners Rule 86(2) Report mailed May 6, 2024", 3 pgs.

"U.S. Appl. No. 16/476,016, Notice of Allowability mailed May 21, 2024", 3 pgs.

"European Application Serial No. 18736496.3, Response filed Jun. 10, 2024 to Communication Pursuant to Article 94(3) EPC mailed Dec. 12, 2023", 13 pgs.

"U.S. Appl. No. 17/809,223, Final Office Action mailed Jun. 13, 2024", 19 pgs.

"U.S. Appl. No. 17/161,453, Non Final Office Action mailed Mar. 15, 2023", 17 pgs.

"U.S. Appl. No. 16/476,016, Non Final Office Action mailed Mar. 28, 2023", 22 pgs.

"European Application Serial No. 18736496.3, Communication Pursuant to Article 94(3) EPC mailed Mar. 24, 2023", 10 pgs.

"European Application Serial No. 18735853.6, Communication Pursuant to Article 94(3) EPC mailed Apr. 3, 2023", 4 pgs.

"U.S. Appl. No. 17/809,223, Response filed Jun. 14, 2023 to Non Final Office Action mailed Feb. 15, 2023", 17 pgs.

"U.S. Appl. No. 17/161,453, Response filed Jun. 15, 2023 to Non Final Office Action mailed Mar. 15, 2023", 15 pgs.

"U.S. Appl. No. 16/476,016, Response filed Jun. 28, 2023 to Non Final Office Action mailed Mar. 28, 2023", 23 pgs.

"U.S. Appl. No. 16/476,016, Examiner Interview Summary mailed Jun. 29, 2023", 2 pgs.

"Canadian Application Serial No. 3,049,391, Examiners Rule 86(2) Report mailed Jul. 6, 2023", 5 pgs.

"Australian Application Serial No. 2021209314, Response filed Jul. 6, 2023 to First Examination Report mailed Jan. 9, 2023", 10 pgs.

"U.S. Appl. No. 17/809,223, Final Office Action mailed Jul. 19, 2023", 17 pgs.

"U.S. Appl. No. 16/476,016, Final Office Action mailed Jul. 20, 2023", 21 pgs.

"European Application Serial No. 18736496.3, Response filed Aug. 3, 2023 to Communication Pursuant to Article 94(3) EPC mailed Mar. 24, 2023", 10 pgs.

"U.S. Appl. No. 16/476,016, Final Office Action mailed Nov. 15, 2022", 20 pgs.

"Australian Application Serial No. 2021209314, First Examination Report mailed Jan. 9, 2023", 5 pgs.

"Canadian Application Serial No. 3,049,391, Response filed Jan. 20, 2023 to Office Action mailed Sep. 26, 2022", 7 pgs.

"U.S. Appl. No. 16/476,016, Examiner Interview Summary mailed Jan. 27, 2023", 2 pgs.

"U.S. Appl. No. 17/809,223, Non Final Office Action mailed Feb. 15, 2023", 15 pgs.

"U.S. Appl. No. 16/476,016, Response filed Feb. 15, 2023 to Final Office Action mailed Nov. 15, 2022", 24 pgs.

U.S. Appl. No. 16/731,325, U.S. Pat. No. 11,071,247, filed Dec. 31, 2019, Implement for Adjustably Metering an Agricultural Field Input According to Different Frame Sections.

U.S. Appl. No. 17/161,453, filed Jan. 28, 2021, Implement for Adjustably Metering an Agricultural Field Input According to Different Frame Sections.

U.S. Appl. No. 14/300,761, U.S. Pat. No. 11,160,204, filed Jun. 10, 2014, Localized Product Injection System for an Agricultural Sprayer.

U.S. Appl. No. 16/476,016, filed Jul. 3, 2019, Localized Product Injection System and Methods for Same.

"U.S. Appl. No. 17/161,453, Final Office Action mailed Sep. 7, 2023", 7 pgs.

"European Application Serial No. 18735853.6, Response filed Sep. 12, 2023 to Communication Pursuant to Article 94(3) EPC mailed Apr. 3, 2023", 9 pgs.

"U.S. Appl. No. 16/476,016, Response filed Oct. 24, 2023 to Final Office Action mailed Jul. 20, 2023", 21 pgs.

"U.S. Appl. No. 16/476,016, Advisory Action mailed Nov. 3, 2023", 3 pgs.

"Canadian Application Serial No. 3,049,391, Response filed Nov. 2, 2023 to Examiners Rule 86(2) Report mailed Jul. 6, 2023", 7 pgs.

"U.S. Appl. No. 17/161,453, Response filed Nov. 7, 2023 to Final Office Action mailed Sep. 7, 2023", 8 pgs.

"U.S. Appl. No. 16/476,016, Pre-Appeal Brief Request filed Nov. 20, 2023", 5 pgs.

"U.S. Appl. No. 17/161,453, Notice of Allowance mailed Nov. 22, 2023", 5 pgs.

"European Application Serial No. 18736496.3, Communication Pursuant to Article 94(3) EPC mailed Dec. 12, 2023", 13 pgs.

"U.S. Appl. No. 16/476,016, Decision on Pre-Appeal Brief Request mailed Dec. 18, 2023", 2 pgs.

"U.S. Appl. No. 17/809,223, Response filed Dec. 19, 2023 to Final Office Action mailed Jul. 19, 2023", 14 pgs.

"U.S. Appl. No. 16/476,016, Examiner Interview Summary mailed Jan. 16, 2024", 2 pgs.

"U.S. Appl. No. 17/809,223, Non Final Office Action mailed Jan. 19, 2024", 17 pgs.

"U.S. Appl. No. 16/476,016, Notice of Allowance mailed Feb. 14, 2024", 8 pgs.

"U.S. Appl. No. 17/161,453, Corrected Notice of Allowability mailed Feb. 23, 2024", 3 pgs.

"U.S. Appl. No. 16/476,016, Corrected Notice of Allowability mailed Feb. 22, 2024", 3 pgs.

"U.S. Appl. No. 17/161,453, Corrected Notice of Allowability mailed Feb. 29, 2024", 2 pgs.

"European Application Serial No. 24174311.1, Extended European Search Report mailed Jul. 10, 2024", 5 pgs.

"Canadian Application Serial No. 3,049,421, Response filed Mar. 25, 2022 to Office Action mailed Nov. 29, 2021", 18 pgs.

"U.S. Appl. No. 16/476,016, Response filed Apr. 11, 2022 to Final Office Action mailed Jan. 11, 2022", 18 pgs.

"U.S. Appl. No. 16/476,016, Examiner Interview Summary mailed Apr. 15, 2022", 2 pgs.

"European Application Serial No. 18735853.6, Communication Pursuant to Article 94(3) EPC mailed Jun. 10, 2022", 3 pgs.

"U.S. Appl. No. 16/476,016, Non Final Office Action mailed Jun. 24, 2022", 15 pgs.

"Canadian Application Serial No. 3,049,391, Office Action mailed Sep. 26, 2022", 4 pgs.

"U.S. Appl. No. 16/476,016, Examiner Interview Summary mailed Oct. 4, 2022", 2 pgs.

"U.S. Appl. No. 16/476,016, Response filed Oct. 24, 2022 to Non Final Office Action mailed Jun. 24, 2022", 22 pgs.

"European Application Serial No. 18735853.6, Response filed Oct. 18, 2022 to Communication Pursuant to Article 94(3) EPC mailed Jun. 10, 2022", 24 pgs.

"U.S. Appl. No. 17/809,223, Preliminary Amendment filed Nov. 3, 2022", 7 pgs.

"U.S. Appl. No. 13/832,735, Final Office Action mailed Aug. 5, 2016", 29 pgs.

"U.S. Appl. No. 13/832,735, Non-Final Office Action mailed Feb. 19, 2016", 26 pgs.

"U.S. Appl. No. 13/832,735, Non-Final Office Action mailed Jul. 15, 2015", 22 pgs.

"U.S. Appl. No. 13/832,735, Response filed May 19, 2016 to Non-Final Office Action mailed Feb. 19, 2016", 13 pgs.

"U.S. Appl. No. 13/832,735, Response filed Nov. 16, 2015 to Non-Final Office Action mailed Jul. 15, 2015", 16 pgs.

"U.S. Appl. No. 14/899,946, Final Office Action mailed Dec. 28, 2018", 41 pgs.

(56) References Cited

OTHER PUBLICATIONS

"U.S. Appl. No. 14/899,946, Non-Final Office Action mailed Mar. 26, 2018", 37 pgs.

"U.S. Appl. No. 14/899,946, Response filed Aug. 27, 2018 to Non Final Office Action mailed Mar. 26, 2018", 27 pgs.

"U.S. Appl. No. 15/029,935, Final Office Action mailed Jul. 11, 2017", 6 pgs.

"U.S. Appl. No. 15/029,935, Non-Final Office Action mailed Mar. 30, 2017", 21 pgs.

"U.S. Appl. No. 15/029,935, Notice of Allowance mailed Aug. 29, 2017", 5 pgs.

"U.S. Appl. No. 15/029,935, Preliminary Amendment filed Apr. 15, 2016", 3 pgs.

"U.S. Appl. No. 15/029,935, Reponse filed Aug. 16, 2017 to Final Office Action mailed Jul. 11, 2017", 11 pgs.

"U.S. Appl. No. 15/029,935, Response filed Jun. 15, 2017 to Non Final Office Action mailed Mar. 30, 2017", 12 pgs.

"U.S. Appl. No. 15/629,696, Corrected Notice of Allowability mailed Aug. 29, 2018", 4 pgs.

"U.S. Appl. No. 15/629,696, Corrected Notice of Allowability mailed Dec. 7, 2018", 2 pgs.

"U.S. Appl. No. 15/629,696, Ex Parte Quayle Action mailed May 3, 2018", 12 pgs.

"U.S. Appl. No. 15/629,696, Response filed Jul. 3, 2018 to Ex Parte Quayle Action mailed May 3, 2018", 13 pgs.

"U.S. Appl. No. 15/629,696, Response to Examiner's Reasons for Allowance filed Nov. 13, 2018", 2 pgs.

"U.S. Appl. No. 15/703,818, Corrected Notice of Allowability mailed Jul. 8, 2019", 2 pgs.

"U.S. Appl. No. 15/703,818, Non-Final Office Action mailed Oct. 11, 2018", 6 pgs.

"U.S. Appl. No. 15/703,818, Notice of Allowance mailed Mar. 20, 2019", 5 pgs.

"U.S. Appl. No. 15/703,818, Preliminary Amendment filed Nov. 3, 2017", 6 pgs.

"U.S. Appl. No. 15/703,8181, Response filed Jan. 11, 2019 to Non Final Office Action mailed Oct. 11, 2018", 9 pgs.

"U.S. Appl. No. 15/821,113, Corrected Notice of Allowability mailed Jan. 2, 2020", 2 pgs.

"U.S. Appl. No. 15/821,113, Corrected Notice of Allowability mailed Jan. 28, 2020", 2 pgs.

"U.S. Appl. No. 16/447,779, Corrected Notice of Allowability mailed May 26, 2021", 2 pgs.

"U.S. Appl. No. 16/447,779, Corrected Notice of Allowability mailed Sep. 9, 2021", 2 pgs.

"U.S. Appl. No. 16/447,779, Non-Final Office Action mailed Jan. 12, 2021", 9 pgs.

"U.S. Appl. No. 16/447,779, Notice of Allowance mailed May 20, 2021", 5 pgs.

"U.S. Appl. No. 16/447,779, Preliminary Amendment filed Dec. 30, 2019", 4 pgs.

"U.S. Appl. No. 16/447,779, Response filed Apr. 12, 2021 to Non-Final Office Action mailed Jan. 12, 2021", 7 pgs.

"U.S. Appl. No. 16/476,016, Final Office Action mailed Jan. 11, 2022", 15 pgs.

"U.S. Appl. No. 16/476,016, Response filed Nov. 29, 2021 to Non-Final Office Action mailed Aug. 31, 2021", 19 pgs.

"U.S. Appl. No. 16/476,069, Preliminary Amendment filed Jul. 3, 2019", 13 pgs.

"U.S. Appl. No. 16/476,069, Response filed Jul. 27, 2021 to Restriction Requirement mailed May 3, 2021", 10 pgs.

"U.S. Appl. No. 16/476,069, Restriction Requirement mailed May 3, 2021", 9 pgs.

"U.S. Appl. No. 17/001,539, 312 Amendment filed Oct. 5, 2021", 3 pgs.

"U.S. Appl. No. 17/001,539, Notice of Allowance mailed Jun. 3, 2021", 12 pgs.

"U.S. Appl. No. 17/001,539, Notice of Allowance mailed Sep. 15, 2021", 11 pgs.

"Application Serial No. PCT/US2014/061150, International Preliminary Report on Patentability mailed Oct. 16, 2015", 10 pgs.

"U.S. Appl. No. 15/629,696, Notice of Allowance mailed Aug. 13, 2018", 5 pgs.

"Australian Application Serial No. 2017285727, First Examination Report mailed May 21, 2019", 2 pgs.

"Australian Application Serial No. 2017285727, Response filed Mar. 23, 2020 to First Examination Report mailed May 21, 2019", 10 pgs.

"Brazilian Application Serial No. 1120160085175, Office Action mailed Jan. 18, 2022", (w/ Concise Statement of Relevance), 26 pgs.

"Brazilian Application Serial No. 1120160085175, Office Action mailed Mar. 25, 2020", (w/ English Translation), 6 pgs.

"Brazilian Application Serial No. 1120160085175, Office Action mailed Nov. 6, 2018", (w/ English Translation), 6 pgs.

"Brazilian Application Serial No. 1120160085175, Response filed Jul. 27, 2020 to Office Action mailed Mar. 25, 2020", (w/ English Translation of Claims), 103 pgs.

"Canadian Application Serial No. 2,877,195, Office Action mailed Dec. 9, 2020", 3 pgs.

"Canadian Application Serial No. 2,877,195, Response filed Apr. 8, 2021 to Office Action mailed Dec. 9, 2020", 16 pgs.

"Canadian Application Serial No. 2,877,195, Response filed Dec. 18, 2019 to Office Action mailed Jun. 18, 2019", 10 pgs.

"Canadian Application Serial No. 2,877,195, Voluntary Amendment filed Nov. 16, 2020", 13 pgs.

"Canadian Application Serial No. 2,926,448, Examiner's Rule 30(2) Requistion mailed Oct. 3, 2018", 3 pgs.

"Canadian Application Serial No. 2,926,448, Office Action mailed Jan. 5, 2018", 5 pgs.

"Canadian Application Serial No. 2,926,448, Response filed Mar. 19, 2019 to Examiner's Rule 30(2) Requisition mailed Oct. 3, 2018", 7 pgs.

"Canadian Application Serial No. 2,926,448, Response filed Jun. 26, 2018 to Office Action mailed Jan. 5, 2018", 19 pgs.

"Canadian Application Serial No. 3,049,391, Office Action mailed Dec. 1, 2021", 4 pgs.

"Canadian Application Serial No. 3,049,421, Office Action mailed Nov. 29, 2021", 4 pgs.

"Canadian Application Serial No. 3,049,421, Response filed Oct. 1, 2021 to Office Action mailed Jun. 4, 2021", 33 pgs.

"European Application Serial No. 18735853.6, Response filed Oct. 28, 2021 to Communication Pursuant to Article 94(3) EPC mailed Jun. 18, 2021", 17 pgs.

"German Application Serial No. 11 2017 003 084.6, Office Action mailed Feb. 5, 2019", (w/ English Translation), 5 pgs.

"International Application Serial No. PCT/US2014/043926, International Preliminary Report on Patentability Jan. 7, 2016", 11 pgs.

"International Application Serial No. PCT/US2014/043926, International Search Report mailed Nov. 3, 2014", 2 pgs.

"International Application Serial No. PCT/US2014/043926, Written Opinion mailed Nov. 3, 2014", 9 pgs.

"International Application Serial No. PCT/US2014/061150, International Search Report mailed Feb. 4, 2015", 2 pgs.

"International Application Serial No. PCT/US2014/061150, Written Opinion mailed Feb. 4, 2015", 7 pgs.

"International Application Serial No. PCT/US2017/038622, International Preliminary Report on Patentability mailed Jan. 3, 2019", 7 pgs.

"International Application Serial No. PCT/US2017/038622, International Search Report mailed Sep. 28, 2017", 2 pgs.

"International Application Serial No. PCT/US2017/038622, Written Opinion mailed Sep. 28, 2017", 5 pgs.

"International Application Serial No. PCT/US2020/047696, International Search Report mailed Nov. 23, 2020", 2 pgs.

"International Application Serial No. PCT/US2020/047696, Written Opinion mailed Nov. 23, 2020", 4 pgs.

"International Application Serial No. PCT/US2021/038955, International Search Report mailed Sep. 29, 2021", 2 pgs.

"International Application Serial No. PCT/US2021/038955, Written Opinion mailed Sep. 29, 2021", 5 pgs.

(56)                References Cited

OTHER PUBLICATIONS

"Wilger 2019-20 Manufacturer's Suggested Retail Price List", (Revised Sep. 1, 2019), 20 pgs.

Bevly, David M, et al., "Carrier-Phase Differential GPS for Control of a Tractor Towed Implement", Proceedings of the 13th International Technical Meeting of the Satellite Division of The Institute of Navigation (ION GPS 2000), (2000), 2263-2268.

Dietz, John, "A five-part program for efficient farming", Farming, (Apr. 2000), 1-4.

Elmore, Clyde L., "Soil Solarization a Nonpesticidal Method for Controlling Diseases, Nematodes, and Weeds", University of California Division of Agriculture and Natural Resources Publication 21377, (1997), 1-17.

Madsen, Jesper, et al., "Measurement of droplet size and velocity distributions in sprays using Interferometric Particle Imaging (IPI) and Particle Tracking Velocimetry (PTV)", Proceedings, 9th International Conference on Liquid Atomization and Spray Systems—ICLASS 2003, (Jan. 2003), 9 pgs.

Van Zuydam, R. P, "A driver's steering aid for an agricultural implement, based on an electronic map and Real Time Kinematic DGPS", Computers and Electronics in Agriculture, 24(3), (Dec. 1999), 153-163.

Van Zuydam, R. P, "Centimeter-Precision Guidance of Agricultural Implements in the Open Field by Means of Real Time Kinematic Dgps", Proceedings of the Fourth International Conference on Precision Agriculture, (1999), 1023-1034.

"U.S. Appl. No. 17/809,223, Advisory Action mailed Sep. 18, 2024", 3 pgs.

"U.S. Appl. No. 17/809,223, Examiner Interview Summary mailed Sep. 10, 2024", 3 pgs.

"U.S. Appl. No. 17/809,223, Non Final Office Action mailed Dec. 27, 2024", 7 pgs.

"U.S. Appl. No. 17/809,223, Response filed Sep. 13, 2024 to Final Office Action mailed Jun. 13, 2024", 18 pgs.

"Australian Application Serial No. 2023258379, First Examination Report mailed Jan. 16, 2025", 4 pgs.

"Canadian Application Serial No. 3,185,961, Response filed Aug. 12, 2024 to Examiners Rule 86(2) Report mailed May 6, 2024", 8 pgs.

"European Application Serial No. 24174311.1, Response filed Feb. 6, 2025 to Extended European Search Report mailed Jul. 10, 2024", 16 pgs.

"Australian Application Serial No. 2023258379, Response filed Mar. 13, 2025 to First Examination Report mailed Jan. 16, 2025", 3 pgs.

"U.S. Appl. No. 17/809,223, Response filed Mar. 27, 2025 to Non Final Office Action mailed Dec. 27, 2024", 11 pgs.

"U.S. Appl. No. 17/809,223, Notice of Allowance mailed Apr. 25, 2025", 5 pgs.

El Operator, "Direct injection into the nozzle", [Online]. Retrieved from the Internet: https: www.eioperator.comdirect-injection-into-the-nozzle , (Accessed online Jul. 30, 2025), 7 pages.

"European Application Serial No. 24174311.1, Communication Pursuant to Article 94(3) EPC mailed Oct. 9, 2025", 4 pgs.

* cited by examiner

700

702

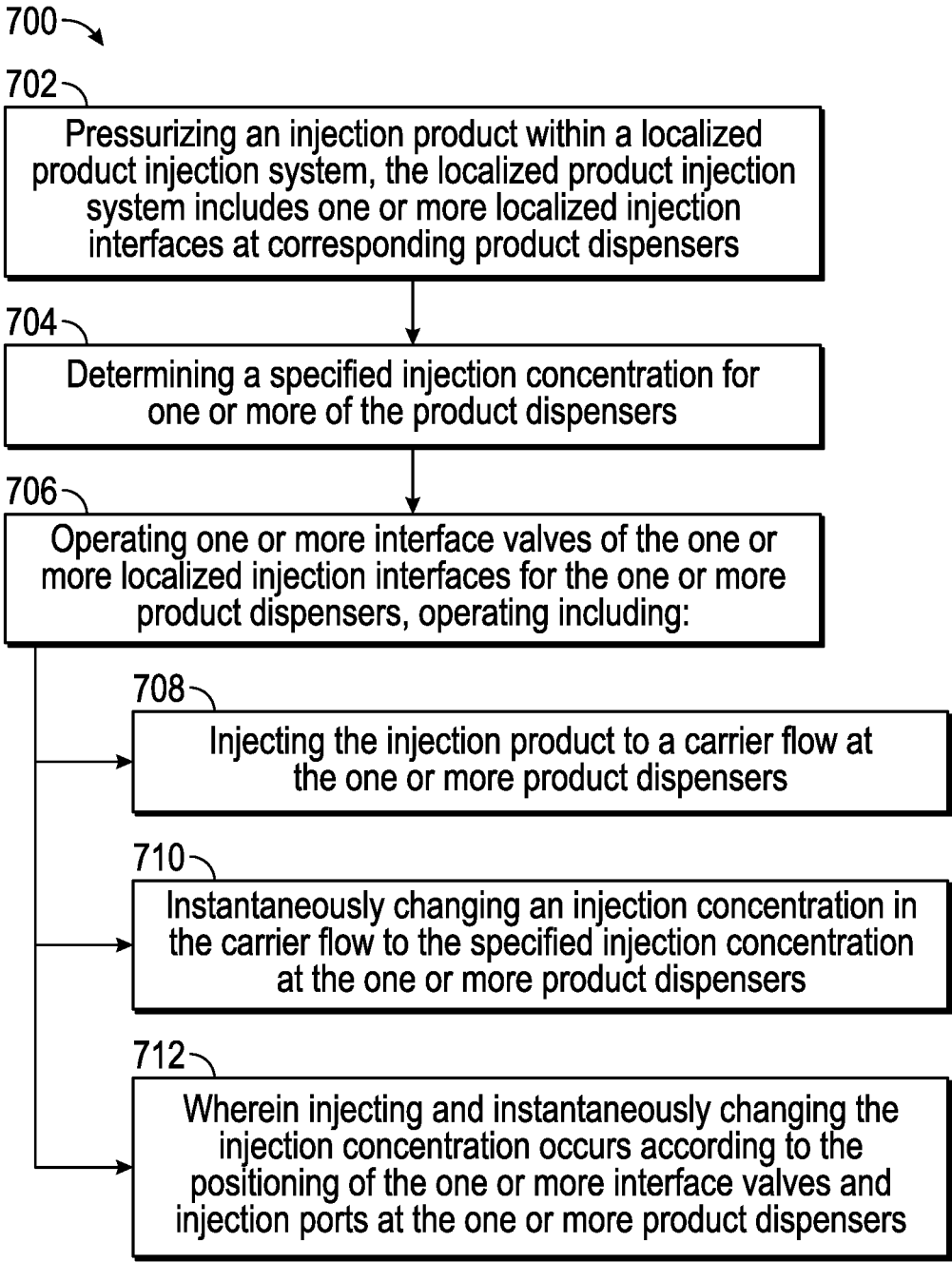

Pressurizing an injection product within a localized product injection system, the localized product injection system includes one or more localized injection interfaces at corresponding product dispensers

704

Determining a specified injection concentration for one or more of the product dispensers

706

Operating one or more interface valves of the one or more localized injection interfaces for the one or more product dispensers, operating including:

708

Injecting the injection product to a carrier flow at the one or more product dispensers

710

Instantaneously changing an injection concentration in the carrier flow to the specified injection concentration at the one or more product dispensers

712

Wherein injecting and instantaneously changing the injection concentration occurs according to the positioning of the one or more interface valves and injection ports at the one or more product dispensers

FIG. 7

LOCALIZED PRODUCT INJECTION SYSTEM FOR AN AGRICULTURAL SPRAYER

PRIORITY CLAIMS

This application is a continuation of Ser. No. 14/300,761, filed Jun. 10, 2014, which claims the benefit of priority to U.S. Application Ser. No. 61/833,290 filed on Jun. 10, 2013, entitled LOCALIZED PRODUCT INJECTION SYSTEM FOR AN AGRICULTURAL SPRAYER, the entire contents of which are hereby incorporated in its entirety.

CROSS-REFERENCE TO RELATED PATENT DOCUMENTS

This patent application is also related to U.S. application Ser. No. 13/832,735 filed on Mar. 15, 2013, entitled MULTI-SECTION APPLICATOR WITH VARIABLE-RATE SECTIONS.

This patent application is also related to U.S. application Ser. No. 13/832,678 filed on Mar. 15, 2013, entitled REAL TIME INJECTION FOR AGRICULTURAL SPRAYERS.

This patent application is also related to U.S. Application Ser. No. 61/803,942 filed on Mar. 21, 2013, entitled GEAR FLOW DIVIDER FOR AGRICULTURAL PRODUCT INJECTION.

COPYRIGHT NOTICE

TECHNICAL FIELD

This document pertains generally, but not by way of limitation, to the application of products (granular, fluid or gaseous) and supplementing of the products.

BACKGROUND

Agricultural sprayers are used to distribute agricultural products, such as fertilizers, insecticides, herbicides and fungicides to crops. Agricultural sprayers include one or more distribution booms that are long enough (e.g., 60 feet to 150 feet) to spray multiple rows of crops in a single pass. Agricultural fields are often irregular in shape and contain one or more of contour changes, tree lines, hillsides, ponds or streams. Irregular field shapes and contour changes provide challenges in even distribution of agricultural products and can lead to waste of agricultural products. Additionally, the configuration of the agricultural sprayer itself may cause unpredictable variation in application of agricultural products.

Agricultural sprayers include a reservoir for a carrier substance. The reservoir is in communication, by way of a header tube or pipe, with a plurality of sections provided along one or more carrier booms (e.g., boom tubes). The header is the main line extending between the reservoir and the carrier booms. Each of the plurality of sections includes multiple sprayer nozzles that distribute the carrier substance received by the section. The carrier substance is used as a vehicle to carry and distribute one or more injection products dispersed into the carrier substance, for instance herbicides, pesticides, fertilizers or the like.

In one example, the injection product is retained in a reservoir separate from the reservoir for the carrier substance. The injection product is pumped from the reservoir and delivered from the reservoir to the header of the carrier substance. In some examples, an inline mixer (e.g., a static mixer) mixes the injected chemical with the carrier substance upstream from or within the header. The header then delivers the mixture to the boom tubes, and the mixture is distributed to the sections and finally the nozzles associated with each of the sections.

Overview

The present inventors have recognized, among other things, that a problem to be solved can include minimizing lag time and latency between the introduction of an injection product to a carrier flow and application (dispensing) of the carrier flow with the proper concentration of the injection product. In an example, the present subject matter can provide a solution to this problem, such as by providing a localized product injection system in communication with a carrier substance distribution system. The localized product injection system communicates with the carrier substance distribution system locally, for instance at the plurality of product dispensers such as one or more of the sprayer sections or the individual sprayer nozzles of the sprayer sections.

In one example, the localized product injection system includes a plurality of localized injection interfaces that maintain a pressurized source of the injection product immediately adjacent to each of the product dispensers and accordingly ready for instantaneous injection to the flow of the carrier substance immediately prior to dispensing through product dispensers. For instance, each of the plurality of localized injection interfaces includes an interface valve and an injection port. Because the interface valve is positioned at the corresponding product dispenser, upon operation of the interface valve the injection product is instantaneously provided through the injection port to the dispenser (e.g., one or more of a sprayer section or sprayer nozzle). Accordingly, lag time for delivery and in-line mixing through a header, the boom tubes associated with each carrier boom, and the sections on each carrier boom are eliminated. Instead, the localized injection interfaces provide a pressurized source of the injection product at the product dispensers that is ready for instantaneous injection and mixing with the carrier flow immediately prior to dispensing.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 7 is a block diagram showing one example of a method for using a localized product injection system.

DETAILED DESCRIPTION

Figure 1A:
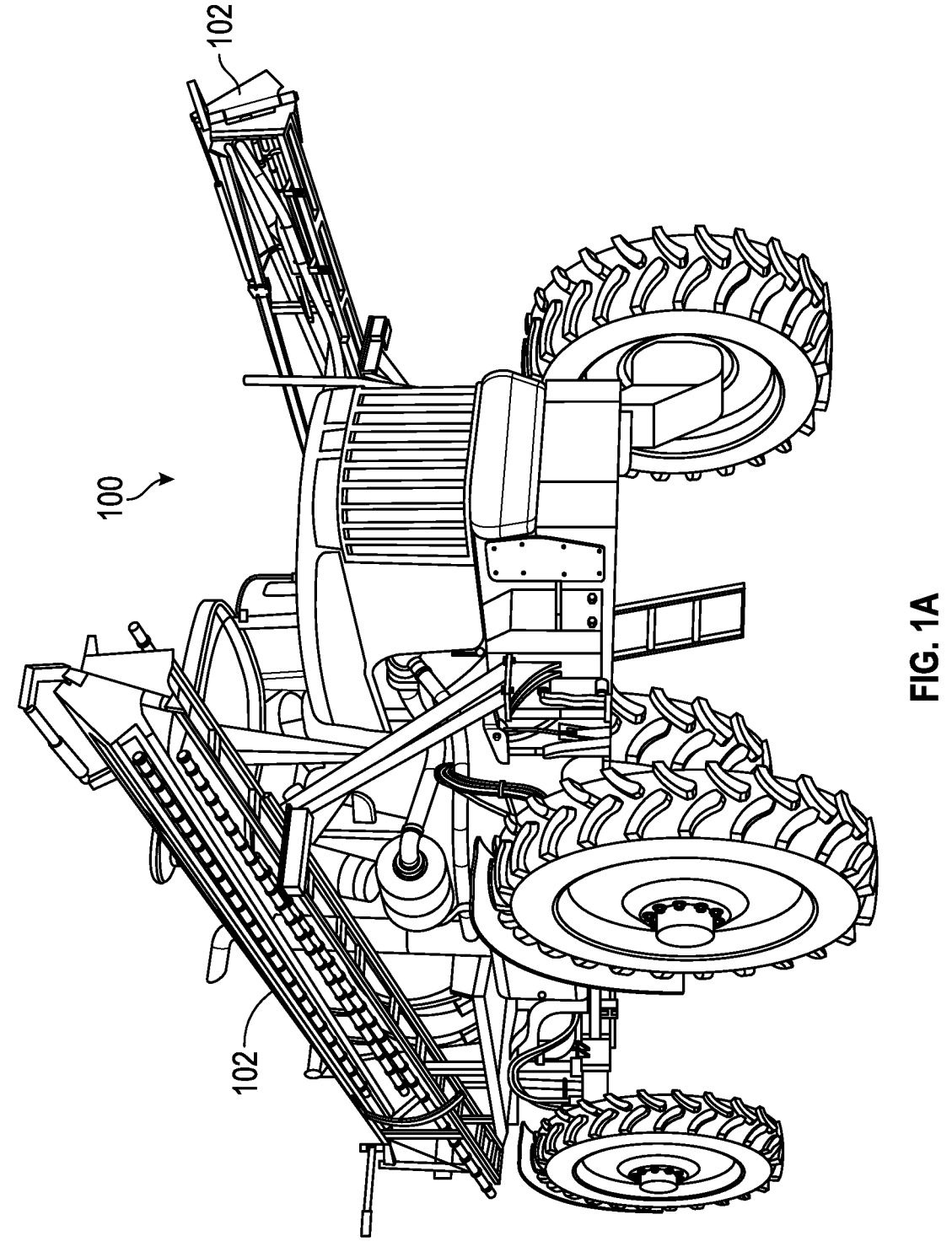
FIG. 1A is a perspective view of one example of an agricultural sprayer.

FIG. 1A shows one example of a sprayer 100. As shown, sprayer 100 is a vehicle based sprayer including an agricultural product dispensing system carried by the vehicle. In another example, the sprayer 100 includes, but is not limited to, a trailer housed sprayer configured for coupling with a vehicle, such as a tractor or the like. As shown in FIG. 1A, the sprayer 100 includes at least two sprayer booms 102. The sprayer booms 102 shown in FIG. 1A are in a stowed configuration, for instance during transport of the sprayer 100 into a field. The sprayer is configured to apply one or more agricultural products including, but not limited to, fertilizers, herbicides, pesticides or the like. The sprayer 100 applies the agricultural product in a liquid form, for instance through one or more nozzle assemblies positioned along the sprayer boom 102 according to the spacing of rows of agricultural crops. As will be described herein, the sprayer 100 applies the agricultural product by mixing an injection product with a carrier fluid to achieve a desired concentration of the injection product (a fertilizer, herbicide, pesticide or the like) within the carrier fluid. In another example, the injection product includes a plurality of injection products, for instance injected separately by way of differing injection systems or injected as a common mixture of fluids (e.g., from a mixed injection reservoir) into the product dispensers including one or more of the boom sections and nozzle assemblies of the sprayer booms 102.

As will be described herein, an agricultural product is provided in a localized manner to each of the product dispensers whether boom sections or nozzles to provide individualized control of application of the agricultural product. Further, the instantaneous injection of the injection product to the carrier fluid stream prior locally to the product dispensers (boom sections, nozzle assemblies or the like) ensures lag time between a desired change in concentration of the injection product and the corresponding application of the adjusted agricultural product is minimized (e.g., negligible lag time or allows for near instant injection and dispensing of the resulting agricultural product). In contrast, other systems mix the injection product upstream from the product dispensers, for instance within the carrier fluid reservoir or at an interchange near a header pump for the carrier fluid. These systems have lag between the interchange and the product dispensers and further preclude the individualized control of the agricultural product (e.g., injection concentration) at the product dispensers. Stated another way, a localized product injection system as described herein provides a pressurized environment for the injection product at the one or more product dispensers (e.g., locally) for instance the boom sections, nozzles, nozzle assemblies or the like. Accordingly, the injection product is provided under pressure to the carrier fluid at the product dispensers immediately prior to application to an agricultural crop.

Figure 1B:
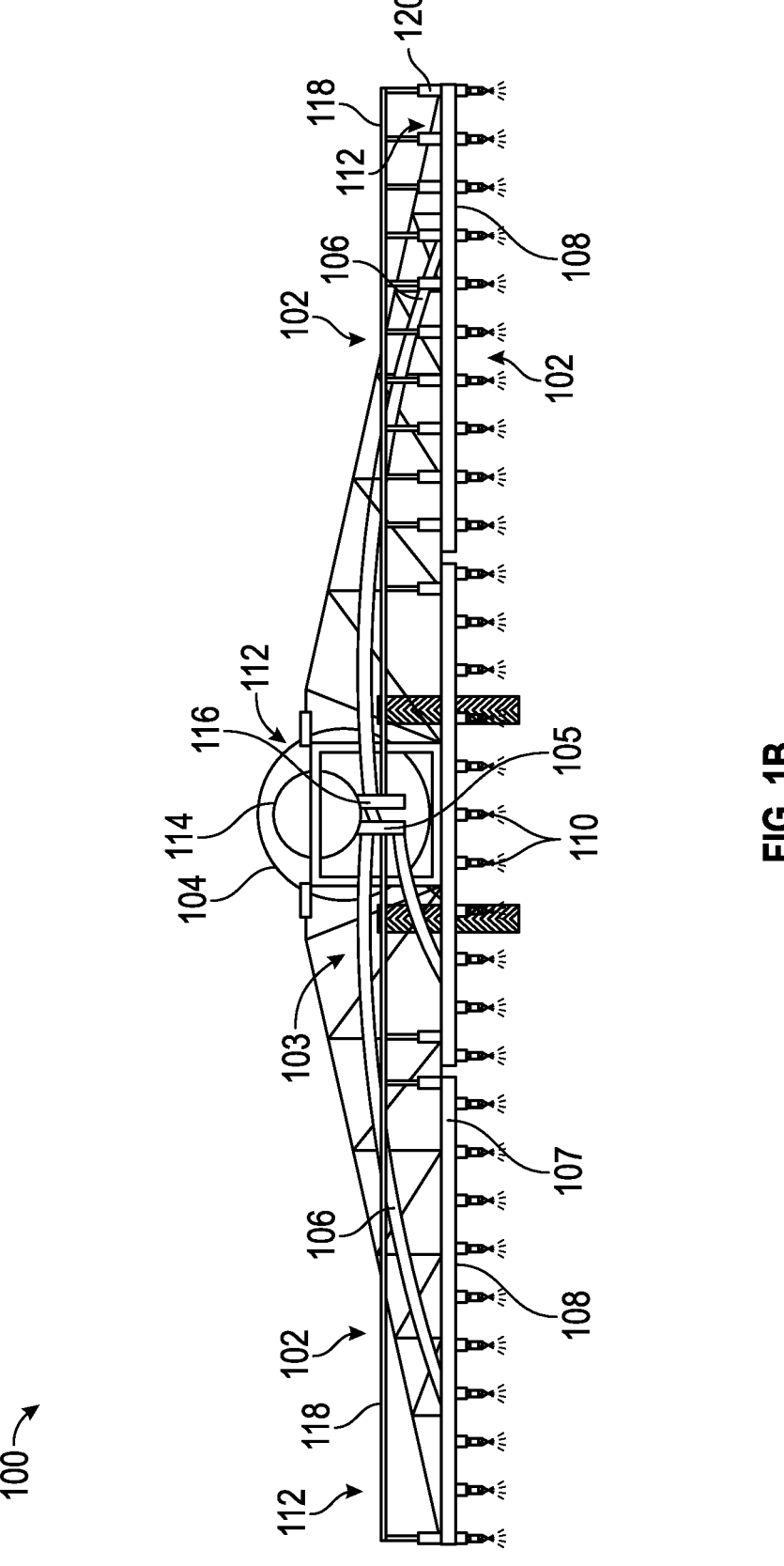
FIG. 1B is a schematic view of one example of an agricultural sprayer including a localized product injection system.

Referring now to FIG. 1B, a schematic representation of the sprayer 100 shown in FIG. 1A is provided. In this example the sprayer booms 102 are in a deployed configuration, for instance extending away from the vehicle 100 shown in FIG. 1A. As shown, the sprayer 100 includes a carrier system 103 including a carrier reservoir 104 positioned centrally within the vehicle or tender. The carrier reservoir 104 includes a carrier fluid therein, for instance water or the like. In another example, the carrier reservoir 104 includes a carrier fluid such as water mixed with an initial carrier product (e.g., a mixed carrier formulation). The carrier fluid in such an example includes, but is not limited to, a primary fertilizer, a primary chemical or water base and fertilizer mixture, spray adjuvant, surfactant or the like.

The carrier fluid is distributed from the carrier reservoir by way of a header 105 coupled with one or more boom tubes 106. The boom tubes 106 extend along the sprayer booms 102 as shown in FIG. 1B and corresponding transport the carrier fluid the length of the sprayer booms. As further shown in FIG. 1B, the boom tubes 106 are in communication with one or more corresponding boom sections 108. The boom sections 108 are positioned along the sprayer booms 102 and each provide a plurality of nozzle assemblies 110. As will be described herein, the product dispensers 107 include, but are not limited to, one or more of the boom sections 108, the nozzle assemblies 110 or a combination of both. Carrier fluid is accordingly distributed from the carrier reservoir 104 through the header 105 into the boom tubes 106. The carrier fluid is then carried from the boom tubes 106 to one or more boom sections 108 and the associated nozzle assemblies 110 for application of the carrier fluid (mixed with the injection product as described herein) to the agricultural crops.

The localized product injection system 112 is also shown schematically in two different formats in FIG. 1B. In each of the formats the localized product injection system 112 includes a product injection reservoir 114 separate from the carrier reservoir 104. The product injection reservoir 114 includes a volume of the injection product therein (concentrated fertilizer, herbicide, pesticide or the like). The product injection reservoir 114 feeds into an injection header 116 which is in communication with one or more injection boom tubes 118 extending along the sprayer booms 102.

In one example, shown in FIG. 1B the injection boom tubes 118 are coupled with the product dispensers 107 (the boom sections 108) by one or more injection interfaces 120. For instance at the left side of FIG. 1B the injection interfaces 120 are provided at opposed ends of the boom section 108. In another example, the injection interfaces 120 are provided at a single or multiple locations along the boom section 108. The injection product is distributed to the boom section 108 through the injection interfaces 120. As will be described herein in one example the injection interfaces 120 include at least one control valve configured to vary the flow of the injection product into the product dispenser 107 (in this case the boom section 108) for mixing with the carrier fluid prior to application.

The second format of the localized product injection system 112 is also shown in the FIG. 1B schematic view. In this example the injection interfaces 120 are coupled with the nozzle assemblies 110 of one or more boom sections 108. For instance, as shown at the right portion of the sprayer 100 the injection interfaces 120 are provided at each of the nozzle assemblies 110. For instance the injection interfaces 120 provide individualized injection of the injection product to each of the nozzle assemblies 110. In contrast to injection to the boom sections 108 and corresponding individualized control of the injection product concentration in the boom sections, the injection interfaces 120 at the nozzle assemblies 110 provide individualized control of the concentration of the injection product at each of the nozzle assemblies 110. Accordingly, the controlled injection of the injection product by the injection interfaces allows for individualized control of the product dispensers, including individualized control of one or more of the boom sections 108 or the nozzle assemblies 110.

As further shown in FIG. 1B, the localized product injection system 112 provides a pressurized environment for the injection product at the injection interfaces 120 (whether the injection interfaces are at the boom section 108 or nozzle assemblies 110). That is to say, the injection product is maintained at a pressure for immediate injection into the carrier fluid of the carrier system 103 at the local injection interfaces 120 immediately prior to application of the resulting agricultural product through the product dispensers 107. Accordingly, there is no appreciable lag time between the injection of the injection product to the carrier fluid and application of the resulting agricultural product (including the carrier fluid and the injection product) to the agricultural crop. Additionally, the injection product is immediately mixed with the carrier fluid to the desired concentration, for instance with a static mixer, by virtue of the jet of the injection product into the carrier fluid stream from the injection interfaces 120 or the like. Desired concentration of the injection product is achieved at the product dispensers 107 according to an individualized concentration determination (e.g., with an automated controller) for each corresponding injection interface 120. Accordingly, the sprayer 100 shown in FIG. 1B including the localized product injection system 112 is able to individually control the content of the agricultural product (for instance the concentration of the injection product within the carrier fluid) at each of the injection interfaces 120 and the corresponding product dispensers 107. In the example where the injection interface 120 incudes a boom section 108 the sprayer 100 is thereby able to control the concentration of the injection product at each of the boom sections 108. In another format where the injection interfaces 120 are associated with each of the nozzle assemblies 110 each of the injection interfaces 120 are individually controlled to accordingly provide a desired concentration of the injection product at each of the nozzle assemblies 110.

The injected product is optionally used as a supplemental chemical with mixed carrier formulations for spot treatment in areas of the field where mixed carrier formulation is not sufficient to achieve the desired results (e.g., control of weeds, pests, or yield). In one prophetic example, an operator applies a primary herbicide (Monsanto brand Roundup®) from the carrier reservoir 104. The herbicide is mixed with water and a spray adjuvant in the carrier reservoir 104 for general application to the field for corresponding general weed control. The operator (or field map) is aware that the primary herbicide alone will not control certain weeds at certain areas of the field (e.g., because of resistance to the primary herbicide) and accordingly indexes locations for specified injections of the injection product. The operator uses a supplemental herbicide as an injection product in the injection product reservoir 114 (such as DuPont brand Assure®) to control weeds in those areas in addition to the mixed carrier formulation. Accordingly and as described herein, when the specified areas of the field are reached by the sprayer (e.g., the corresponding one or more product dispensers 107) the injection product including the supplemental herbicide is injected into the corresponding product dispensers 107 and the areas are sprayed with both primary and secondary herbicides. As the product dispensers move out of the designated areas (e.g., the injection product is no longer specified or specified at a differing concentration) the the injection product is injected at a different concentration or shut off from injection to the carrier fluid.

Additionally, the injection product is provided from each of the injection interfaces 120 irrespective of the flow rate of the carrier fluid within the carrier system 103 (e.g., at high or low flow of the carrier fluid). For instance, in a low flow condition only a moderate or small amount of the agricultural product is applied to the agricultural crop corresponding to a low flow of the carrier fluid from carrier system 103. Because of the low flow rate of the carrier fluid in other systems an upstream added injection product has significant residence time and corresponding lag time in the system prior to application at a desired concentration. Stated another way, the lag time already present between addition of the injection product to the carrier fluid at the upstream and its actual application through a product dispenser is increased because of the minimized flow of the carrier fluid. In the sprayer 100 described herein having injection of the injection product locally at the product dispensers 107 the lag time is effectively eliminated. Instead, the localized product injection system 112 provides an immediate or instantaneous injection of the injection product at the injection interfaces 120 to the product dispensers 107 immediately prior to the application of the resulting agricultural product.

Figure 2A:
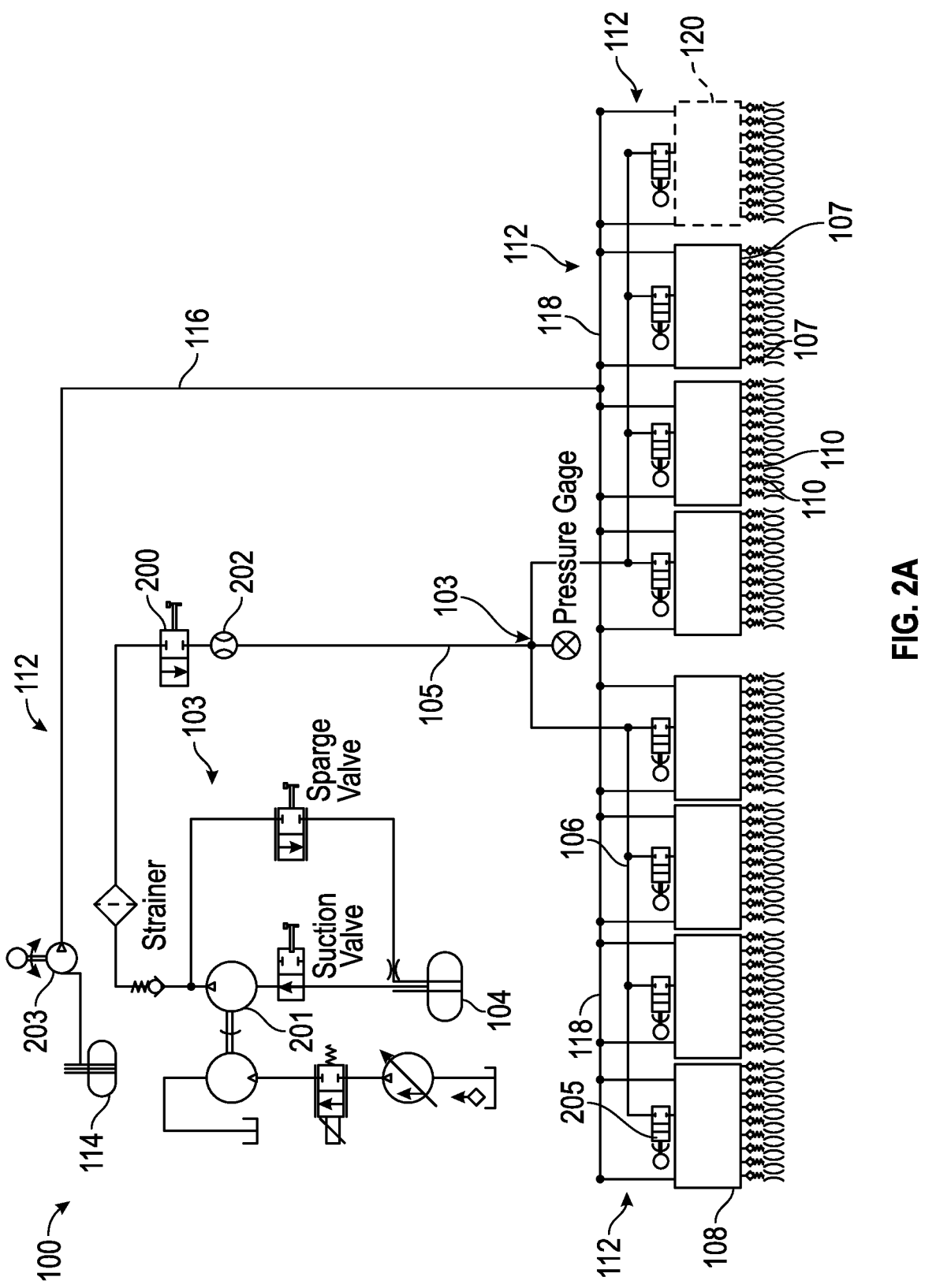
FIG. 2A is a schematic view of an agricultural sprayer including one example of a localized product injection system.

FIG. 2A shows a detailed example of a sprayer 100 including the localized product injection system 112. In the example shown in FIG. 2A the localized product injection system 112 is in the boom section format. For instance, the injection interfaces 120 are coupled with one or more boom sections 108 along the sprayer booms 102 and boom tubes 106 shown in FIG. 1B. The carrier system 103 is shown again in FIG. 2A and includes the carrier reservoir 104. As shown in FIG. 2A the carrier reservoir 104 communicates with the product pump 201 that pressurizes the carrier fluid and delivers it within the header 105 (also shown in FIG. 2A). In one example the carrier system 103 includes a carrier flow control valve 200 and a flow meter 202. The flow meter 202 cooperates with the carrier flow control valve 200 (e.g., with an intervening controller) to measure the output flow from the carrier reservoir 104 (produced by the product pump 201) and to facilitate actuating of the carrier flow control valve 200 to achieve the desired flow rate of carrier fluid to the plurality of boom sections 108 described herein. As further shown in FIG. 2A the header 105 extends to the boom tubes 106 extending to the left and right of the header 105. Each of the boom tubes 106 in turn feeds into a plurality of boom sections 108 and the boom sections 108 each have corresponding nozzle assemblies 110. Optionally, section valves 205 are interposed between each boom section 108 and the corresponding boom tubes 106. The sections valves 205 facilitate control of the carrier fluid flow to each of the boom sections 108.

As described herein and shown in the example provided in FIG. 2A, the product dispensers 107 include the boom sections 108. That is to say, the injection interfaces 120 are coupled with the boom sections 108 and thereby provide individualized control of the injection product to each of the boom sections 108 relative to the other boom sections.

Referring again to FIG. 2A, the localized product injection system 112 previously described and shown in FIG. 1B is shown in further detail. In this example, the injection product reservoir 114 communicates with an injection pump 203. The injection pump 203 delivers the injection fluid from the reservoir 114 to an injection header 116. The injection header 116 delivers the injection product to one or more injection boom tubes 118 extending to the left and right and shown in FIG. 2A. The injection boom tubes 118 distribute the injection product to a plurality of injection interfaces 120. As previously described, the injection interfaces 120 in the example shown in FIG. 2A deliver the injection product directly to each of the product dispensers 107 (e.g., the boom sections 108).

As shown in FIG. 2A the localized product injection system 112 is isolated from the carrier system 103 until localized introduction of the injection product at the injection interfaces 120. Accordingly, the localized product injection system 112 is able to maintain a pressurized environment for the injection product to the injection interfaces 120 (e.g., with the injection pump 203). At the injection interfaces 120 the pressurized injection product is delivered to each of the product dispensers 107 as determined, for instance, by a controller module described herein. Even in low flow situations with a low flow of carrier fluid, metered by the flow meter 202 and the carrier flow control valve 200, the injection product is provided in a pressurized manner and is thereby ready for instantaneous delivery to one or more of the boom sections 108. Accordingly, individualized and instantaneous control of the injection product (e.g., the concentration of the injection product) is achieved for each of the product dispensers 107 including the boom sections 108. The injection product is provided from the injection interfaces 120 locally relative to the to boom sections and remote from the upstream carrier reservoir 104.

Figure 2B:
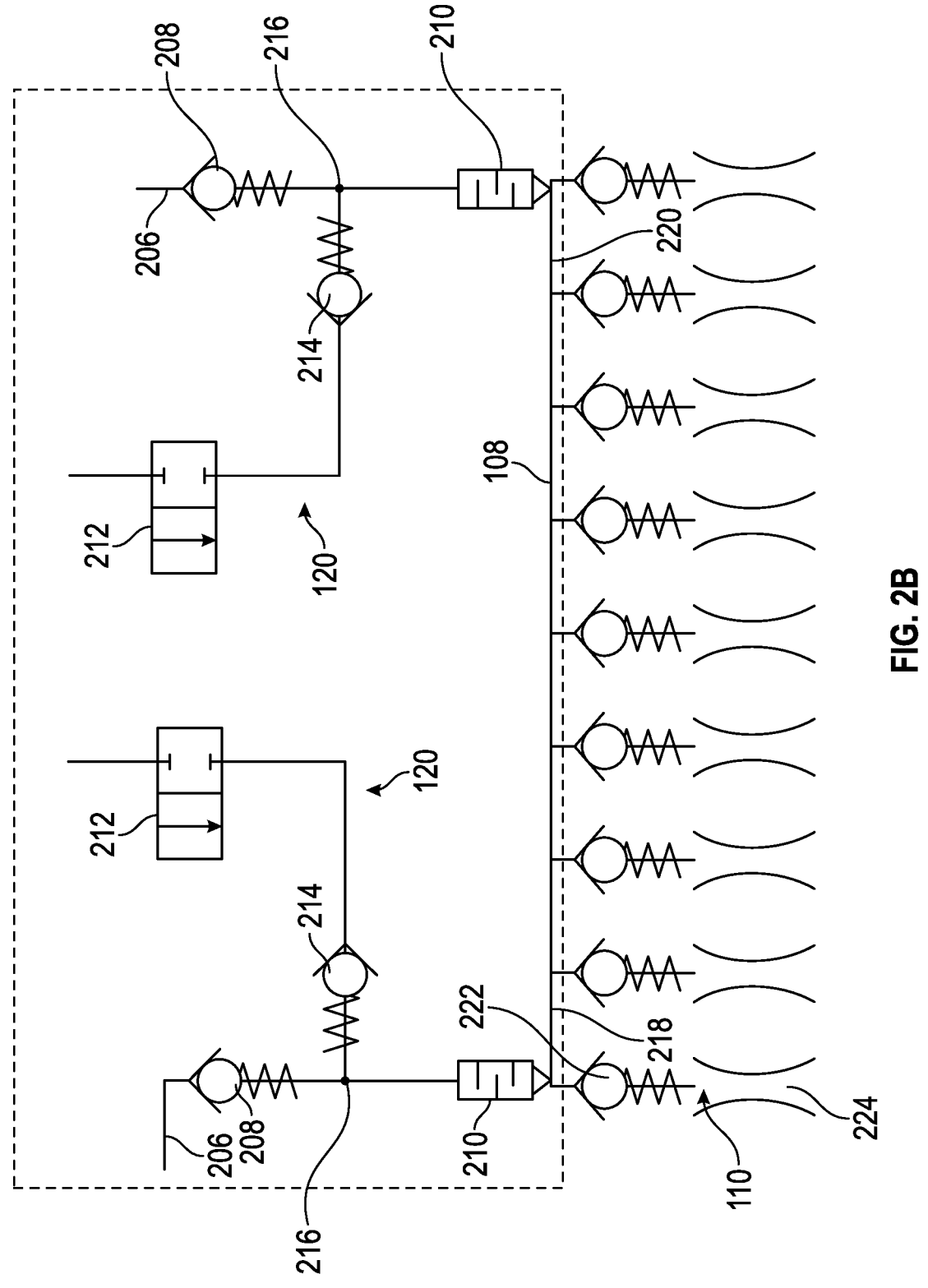
FIG. 2B is a detailed schematic view of one example of a localized injection interface in communication with a sprayer section of FIG. 2A.

Referring now to FIG. 2B, a detailed view of one of the boom sections 108 shown in FIG. 2A is provided. The boom section 108 extends from left to right on the page and includes a plurality of nozzle assemblies 110. In one example, the nozzle assemblies 110 each include a nozzle check valve 222 and a corresponding nozzle 224 (e.g., an atomizer nozzle, stream nozzle or the like). In the example shown in FIG. 2B nine nozzle assemblies 110 are provided in a spaced configuration along the boom section 108. Carrier lines 206 introduce carrier fluid to each of boom section first and second ends 218, 220. In one example each of the carrier lines 206 includes a check valve 208 and a mixer 210 such as a static mixer.

The localized product injection system 112 shown in FIG. 2B includes the injection interfaces 120. In the example shown in FIG. 2B, an injection interface 120 is associated with each of the carrier lines 206 (the carrier lines extending from the boom tube 106 of the carrier system 103 to the boom section 108). Each of the injection interfaces 120 delivers injection product to the associated carrier line 206 in communication with the boom section first and second ends 218, 220.

In one example, the injection interfaces 120 include interface valves 212 in series with check valves 214. In one example the interface valves 212 include pulse width modulation valves or other control valves configured to provide a metered flow of the pressurized injection product through the injection interfaces 120 to injection ports 216 in communication with each of the carrier lines 206. In one example the actuation of the interface valves 212, for instance to a desired flow rate, delivers the designated amount of injection product to each of the corresponding carrier lines 206 at the injection ports 216. The solution of the carrier fluid and the injection product is delivered through the mixers 210 and mixed prior to delivery to the boom section 108. The mixed solution of the carrier fluid and the injection product (the agricultural product) is thereafter delivered from the boom section first and second ends 218, 220 throughout the boom section 108 and to each of the nozzle assemblies 110. Accordingly, each of the nozzle assemblies 110 associated with a particular boom section 108 delivers substantially the same agricultural product having the same injection product concentration. The injection interfaces 120 associated with the boom section 108 are operated independently relative to other injection interfaces 120 associated with other boom sections 108 of the sprayer 100. Accordingly individualized control and instantaneous delivery of the injection product to each of the boom sections 108 is achieved for each of the boom sections 108.

Figure 3A:
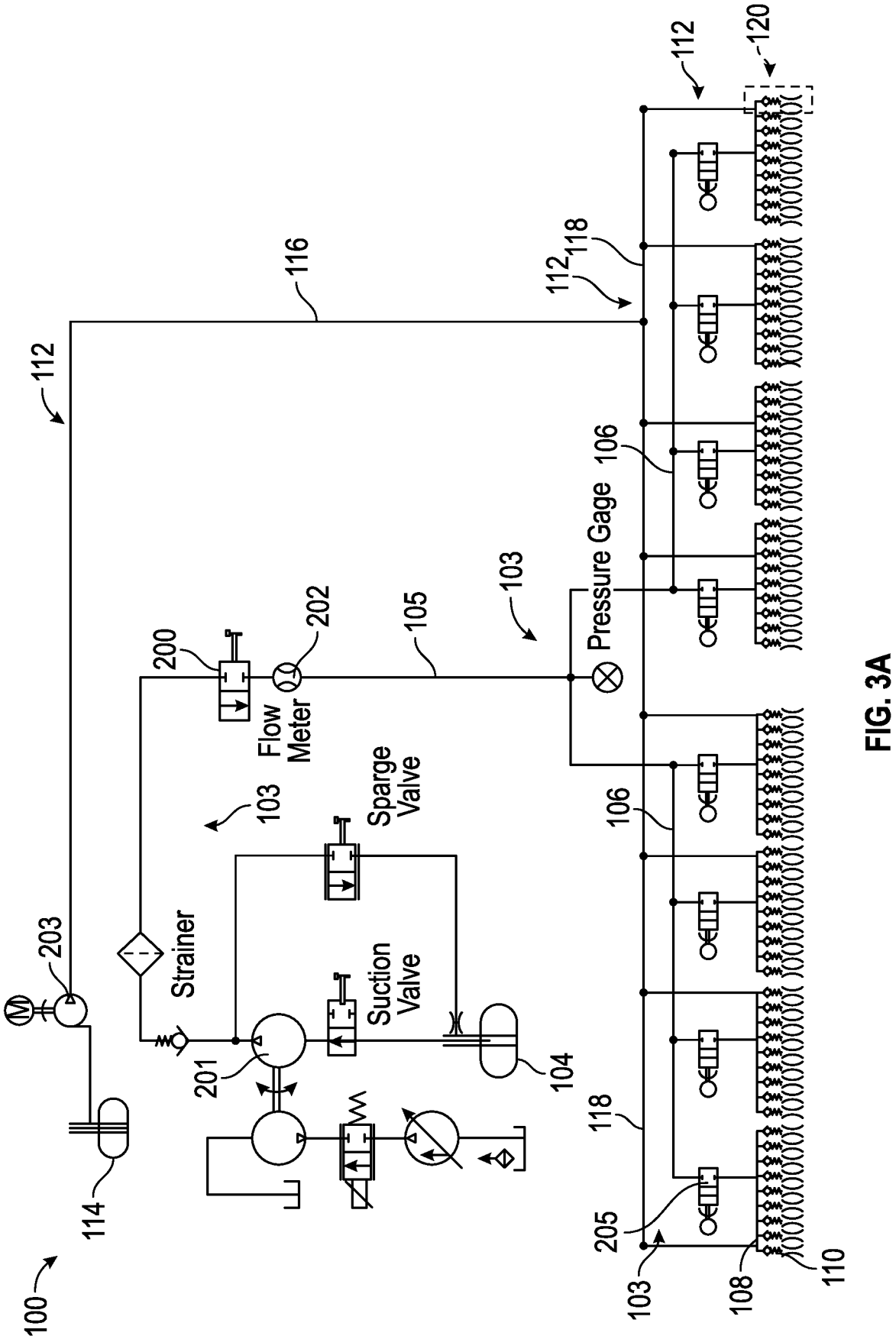
FIG. 3A is a schematic view of an agricultural sprayer including another example of a localized product injection system.
Figure 3B:
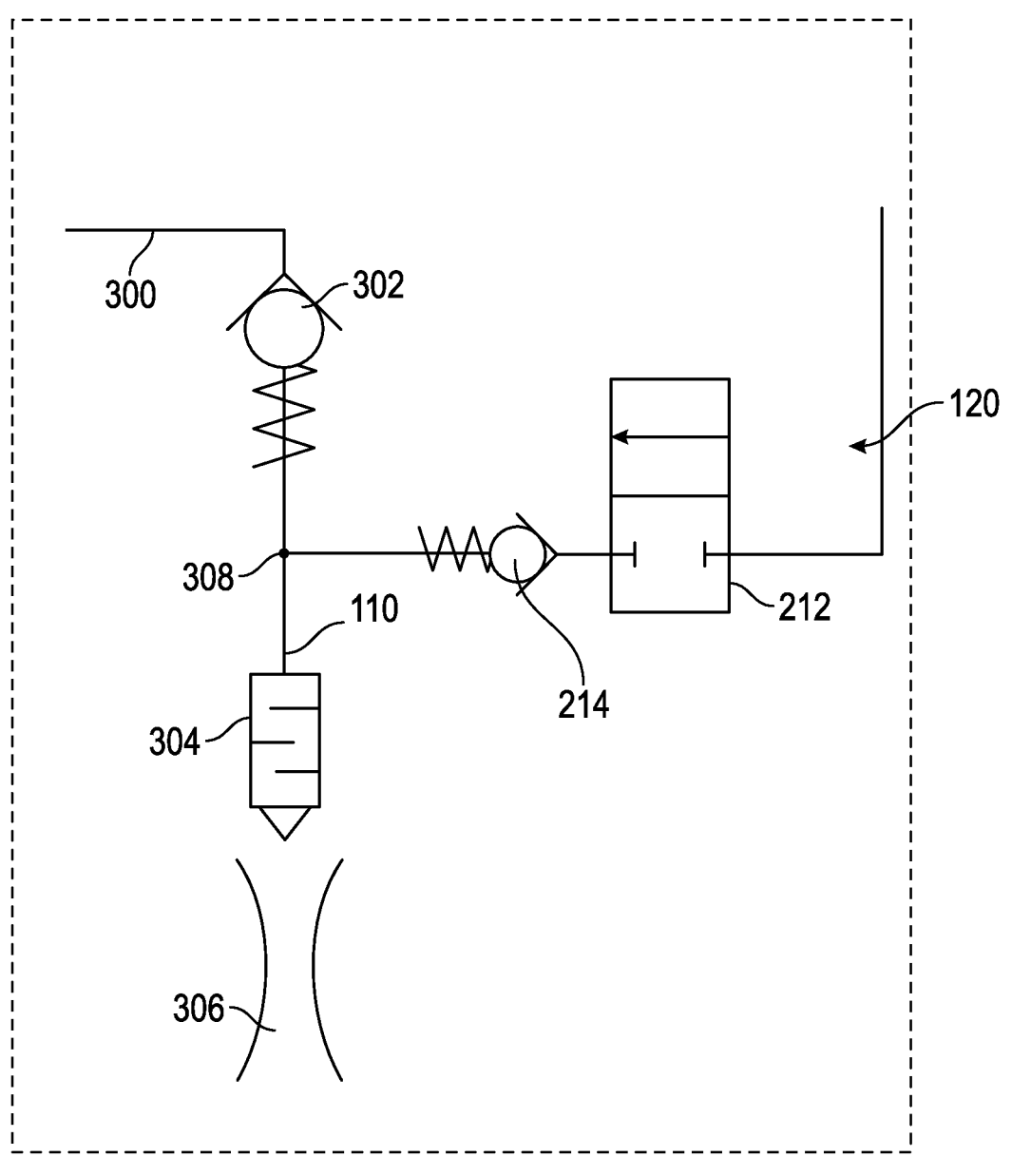
FIG. 3B is a detailed schematic view of another example of a localized injection interface in communication with a sprayer nozzle of FIG. 3A.

FIG. 3A shows another example of the sprayer 100. The example shown in FIG. 3A is similar in at least some regards to the sprayer 100 previously shown and described in FIGS. 2A and 2B. For instance, the sprayer 100 shown in FIGS. 3A and 3B includes an isolated localized product injection system 112 that is separate from the corresponding carrier system 103. As previously described herein, the localized product injection system 112 delivers an injection product from the injection product reservoir 114 to a plurality of boom sections 108. As shown in FIG. 3A and further shown in FIG. 3B, the injection interfaces 120 are each in communication with corresponding nozzle assemblies 110. Stated another way, the product dispensers 107 in the example shown in FIGS. 3A and 3B are the nozzle assemblies 110. Accordingly individualized control and instantaneous injection of the injection product are provided at each of the nozzle assemblies 110. Each of the injection interfaces 120, for instance along the length of the sprayer booms 102, are independently controlled according to determined concentrations of the injection product within the carrier fluid. The dispensed agricultural product from each of the nozzle assemblies thereby has a varying concentration of the injection product based on the independent control of the concentration provided by the injection interfaces 120.

Referring now to FIG. 3B, another example of the injection interface 120 is provided. For instance, as shown in FIG. 3B the injection interface 120 includes an interface valve 212 and a check valve 214 similar in at least some regards to the interface valve and check valves previously described and shown in FIG. 2B. In contrast to the previously described example, the injection interface 120 in this example includes an injection port 308 provided at the nozzle assembly 110 and downstream from a carrier line 300 communicating with the boom section 108 or boom tube 106. The nozzle assembly 110 includes a check valve 302 and an in-line mixer 304 (e.g., a static mixer). The nozzle assembly 110 further includes a nozzle 306, such as an atomizer or stream nozzle in communication with the mixer 304. As shown in FIG. 3B, the injection port 308 is coupled with the nozzle assembly 110, for instance the injection port is interposed between the check valve 302 and the mixer 304.

In operation, the injection product is delivered through the injection boom tubes 118 to each of the injection interfaces 120. The interface valve 212 meters the amount of injection product delivered to the corresponding nozzle assembly 110. For instance, the injection product is independently metered for each of the injection interfaces 120 according to control signals from a controller associated with each of the injection interfaces 120. The controller is configured to control each of the injection interfaces independently or in one or more groups or arrays. The injection product is delivered from the interface valve 212 through the check valve 214 and into the nozzle assembly 110 through the injection port 308. Prior to delivery through the nozzle 306 the injection product in combination with the carrier fluid is optionally mixed within the mixer 304 and thereafter delivered through the nozzle 306 as the agricultural product having the specified concentration of the injection product.

In a similar manner to the localized product injection system 112 shown in FIGS. 2A and 2B the localized product injection system 112 shown in FIGS. 3A and 3B is configured to provide an instantaneous addition of an injection product to the carrier fluid stream immediately prior to its dispensing through the nozzle 306 (e.g., local to the product dispenser 107). Accordingly, instantaneous changes in concentration of the injection product in an agricultural product, for instance for differing parts of a field, are achieved on an instantaneous as-needed basis as the sprayer 100 moves through the field.

Figure 4:
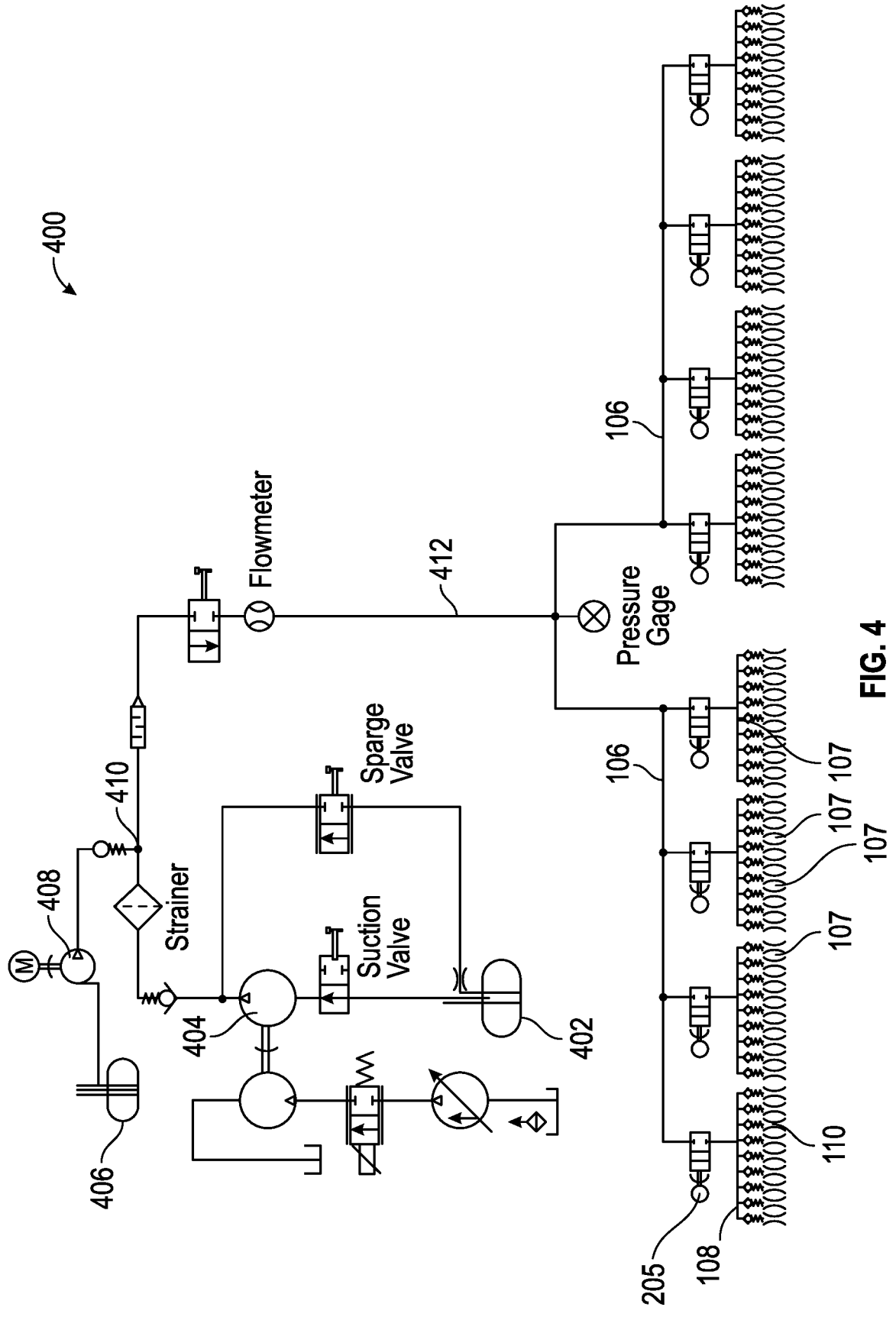
FIG. 4 is a schematic view of another example of an agricultural sprayer.

FIG. 4 shows another example of a sprayer 400. The sprayer 400 shown in FIG. 4 includes a consolidated system having the product injection reservoir 406 and the injection pump 408 feeding into an injection port 410 of a header 412 of the sprayer 400. For instance, the carrier fluid is pumped from a carrier reservoir 402 by a carrier pump 404 and supplemented with the injection product at the injection port 410 (e.g., by the injection pump 408). In one example, a mixer is provided downstream from the injection port 410 for mixing the injection product with the carrier fluid prior to delivery through the header 412 to the boom tubes 406, the boom sections 108 and the nozzle assemblies 110.

As shown in FIG. 4, the injection product is provided to the flow of carrier fluid upstream from the nozzle assemblies 110 and the boom sections 108. Accordingly, there is significant lag time from the time of introduction of the injection product to the carrier fluid and eventual distribution of the agricultural product including the injection product therein from the nozzle assemblies 110. Additionally, beyond the lag time each of the nozzle assemblies 110 and the boom sections 108 (the product dispensers 107) delivers an identical concentration of the injection product within the agricultural product across the sprayer 400. Accordingly, the sprayer 400 does not provide independent control or instantaneous introduction of the injection product to the product dispensers 107.

Figure 5:
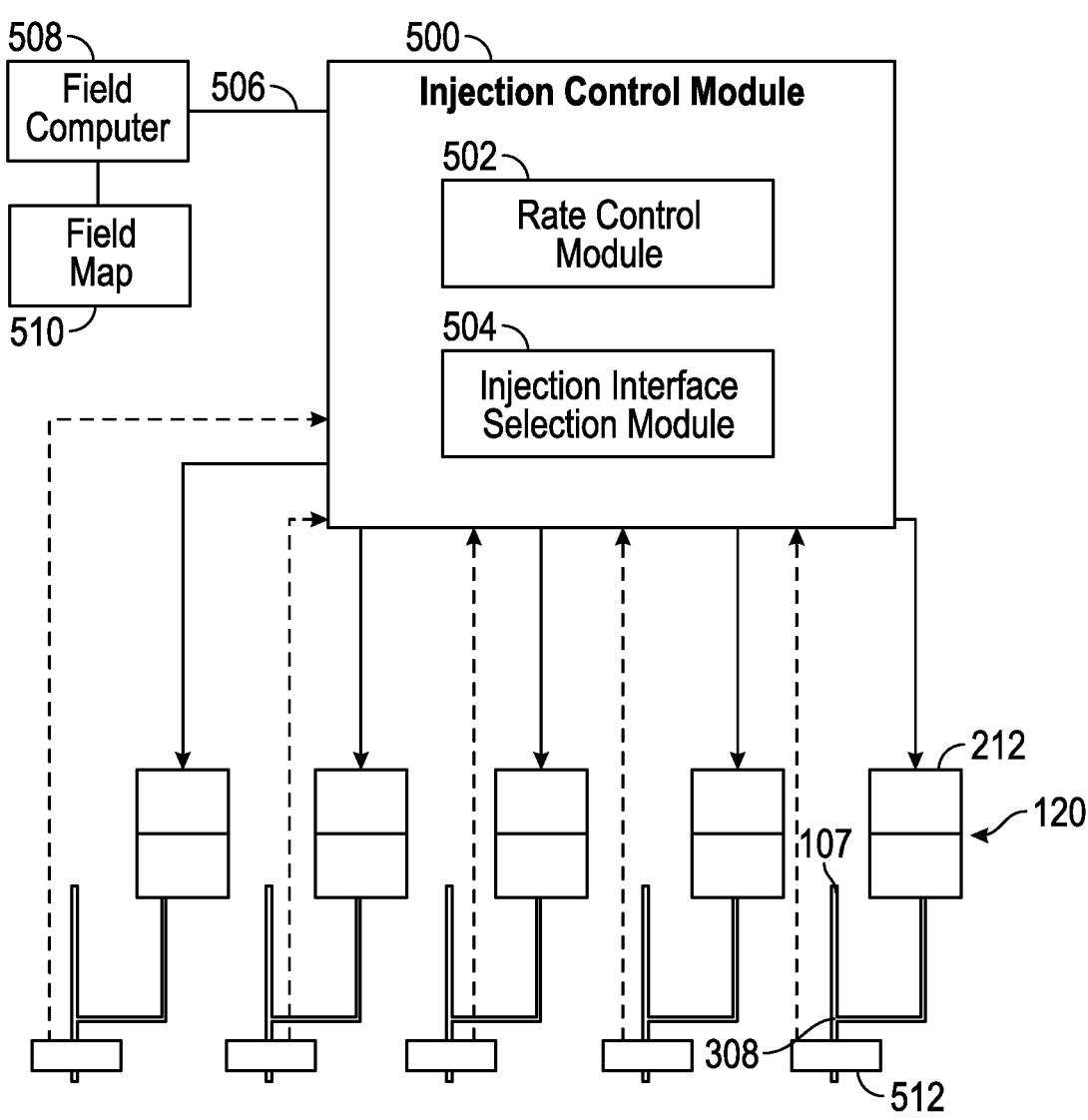
FIG. 5 is a schematic view of one example of an injection control module of a localized product injection system.

FIG. 5 shows one example of a control system 501 for the sprayer 100. In the example shown in FIG. 5, the control system 501 controls a plurality of injection interfaces 120 (five interfaces are shown for exemplary purposes) associated with the nozzle assemblies 110 previously described herein. In a similar manner, the control system 501 is also configured for coupling the injection interfaces 120 associated with either of the nozzle assemblies 110 (as shown in FIG. 3B) as well as the boom sections 108 (shown in FIG. 2B). Stated another way, the control system 501 is used with injection interfaces 120 associated with any of the product dispensers 107.

Referring again to FIG. 5, the control system 501 includes an injection control module 500. The injection control module 500 is in communication with each of the injection interfaces 120, for instance by one or more of wired or wireless connections or the like. The injection control module 500 includes, in one example, a rate control module 502 configured to determine and generate signals for one or more of the injection interfaces 120 corresponding to independent injection flow rates. The flow rates correspond to injection product concentrations for a given flow rate of carrier fluid.

In another example, the injection control module 500 includes an injection interface selection module 504. The injection interface selection module 504 designates one or more of the injection interfaces 120 for adjustment of the injection flow rate of injection product (e.g., on, off, and graduated flow rates of the injection product). The injection interface selection module 504 selects one or more of the injection interfaces 120 for individualized control of the injection interfaces 120 to achieve a desired concentration (e.g., change in concentration) of the injection product in the carrier fluid. The rate control module 502 determines the corresponding rate for each of these selected injection interfaces 120, for instance in cooperation with the field computer interface 506 and a field computer 508 as described herein.

As further shown in FIG. 5, the injection interfaces 120 each include an interface valve 212 in communication with the injection control module 500 as previously described herein. The interface valve 212 accordingly allows for a controlled graduated flow of the injection product through the injection port 308 and into the corresponding product dispenser 107. As shown in FIG. 5, the injection port 308 is identical to the injection port 308 previously described and shown in FIG. 3B. In another example, the injection port 216 is used with the injection interface 120, for instance in a format corresponding to the example shown in FIGS. 2A and 2B, for the product dispenser 107 including the boom section 108.

As further shown in FIG. 5, an optional concentration sensor 512 is downstream from the injection port 308. In one example, the concentration sensor 512 includes a relative concentration sensor configured to detect the concentration of the injection product within the agricultural product based on a comparison of at least one characteristic of the agricultural product at a product dispenser 107 relative to the same at least one characteristic at another product dispenser 107. In another example, the concentration sensor 512 includes a sensor configured to measure one or more characteristics of the injection product (e.g., colors, translucency, or the like corresponding to concentration) relative to a look up table or other database. In still another example, the concentration sensor 512 includes an ultraviolet light sensor that assesses concentration based on color. For instance, a detectable tracer dye is added into the injection reservoir 114 shown in FIGS. 2A and 3A. The concentration sensor 512 is configured to measure the concentration of the tracer dye within the agricultural product and is thereby able to associate the measured concentration of the tracer dye with the corresponding concentration of the injection product. In yet another example, the concentration sensor 512 includes, but is not limited to, a pH detector configured to measure the alkalinity or acidity of the injection product within the agricultural product prior to dispensing through one or more of the product dispensers 107 including the boom sections 108 or nozzle assemblies 110.

As shown in FIG. 5 the concentration sensors 512 are in communication with the injection control module 500. In one example, the concentration sensors 512 cooperate with the injection control module 500 to provide for feedback control of the interface valves 212 of each of the injection interfaces 120. Stated another way, as a specified concentration is provided to one or more of the interface valves 212 the corresponding concentration sensors 512 for those injection interfaces 120 measure the concentration in an ongoing manner and accordingly allow for adjustments of the interface valves 212 to accordingly ensure the interface valve 212 is actuated to administer the appropriate concentration of the injection product to the carrier fluid. Accordingly, the agricultural product dispensed from each of the product dispensers 107 (the boom sections 108 or nozzle assemblies 110) has the concentration of the injection product determined by the injection control module 500 despite variations in the localized product injection system 112, in the carrier system 103 or the like.

In another example, the injection control module 500 includes a field computer interface 506. As shown, the field computer interface 506 provides an interface for coupling with a field computer 508 (part of the sprayer 100, with a leading vehicle such as a tractor, or a standalone device) and the field computer 508 includes a field map 510. As will be described herein the field map 510 includes a series of prescriptions of agricultural products, seed types, irrigation or the like for various zones. The differing prescriptions for each of the zones are determined through analysis of the field terrain, yields from previous crops, environmental conditions or the like.

The field map 510 provides a plurality of prescriptions for an agricultural product or agricultural products throughout the field (e.g., in one or more of the zones of the field). As the field computer 508 communicates with the injection control module 500 the injection control module uses the field map 510 and its associated zone based prescriptions to independently specify the flow rate of an injection product for each of the injection interfaces 120 for corresponding product dispensers 107.

Further, with GPS systems, mathematical representations of the product dispensers 107 (e.g., the boom sections 108 or nozzle assemblies 110) along the sprayer booms 102, or the like the location of each of the product dispensers 107 of the sprayer 100 is continuously determined on the field map. As one or more product dispensers 107 of the sprayer 100 are within a zone or are poised to enter a zone the injection control module 500 (e.g., with the injection interface selection module 504) selects the corresponding injection interfaces 120 for adjustment of the injection product concentration based on the field map prescription. As discussed herein, the injection product concentration is changed instantaneously at the product dispensers 107 (e.g., with minimal lag time) relative to the application of the resulting agricultural product according to the prescription. Accordingly, as one or more of the product dispensers 107 are positioned within or are poised to enter into a particular zone having a prescribed concentration of the injection product the rate control module 502 assesses the corresponding injection product concentration and actuates the interface valves 212 of the injection interfaces 120 associated with the one or more corresponding product dispensers 107. The interface valves 212 are operated (opened, closed or graduated therebetween) to achieve the flow rate of the injection product that results in the specified concentration for that portion of the field map.

The injection product is thereby introduced in an instantaneous manner at the product dispensers 107 (e.g., locally to the dispensers) immediately prior to dispensing of the agricultural product having the desired concentration to that corresponding portion of the field. The sprayer 100 described herein is able to instantaneously deliver an accurate concentration of the injection product to the carrier system at one or more of the injection interfaces 120 by way of individualized control of each of those injection interfaces 120. Accordingly, with the field map 510 having various prescriptions and a plurality of product dispensers 107 with individually controlled injection interfaces 120 a multitude of injection product concentrations are provided across the sprayer 102 to accordingly provide the agricultural product with varying concentrations of the injection product to a corresponding variety of different parts of the field.

Figure 6:
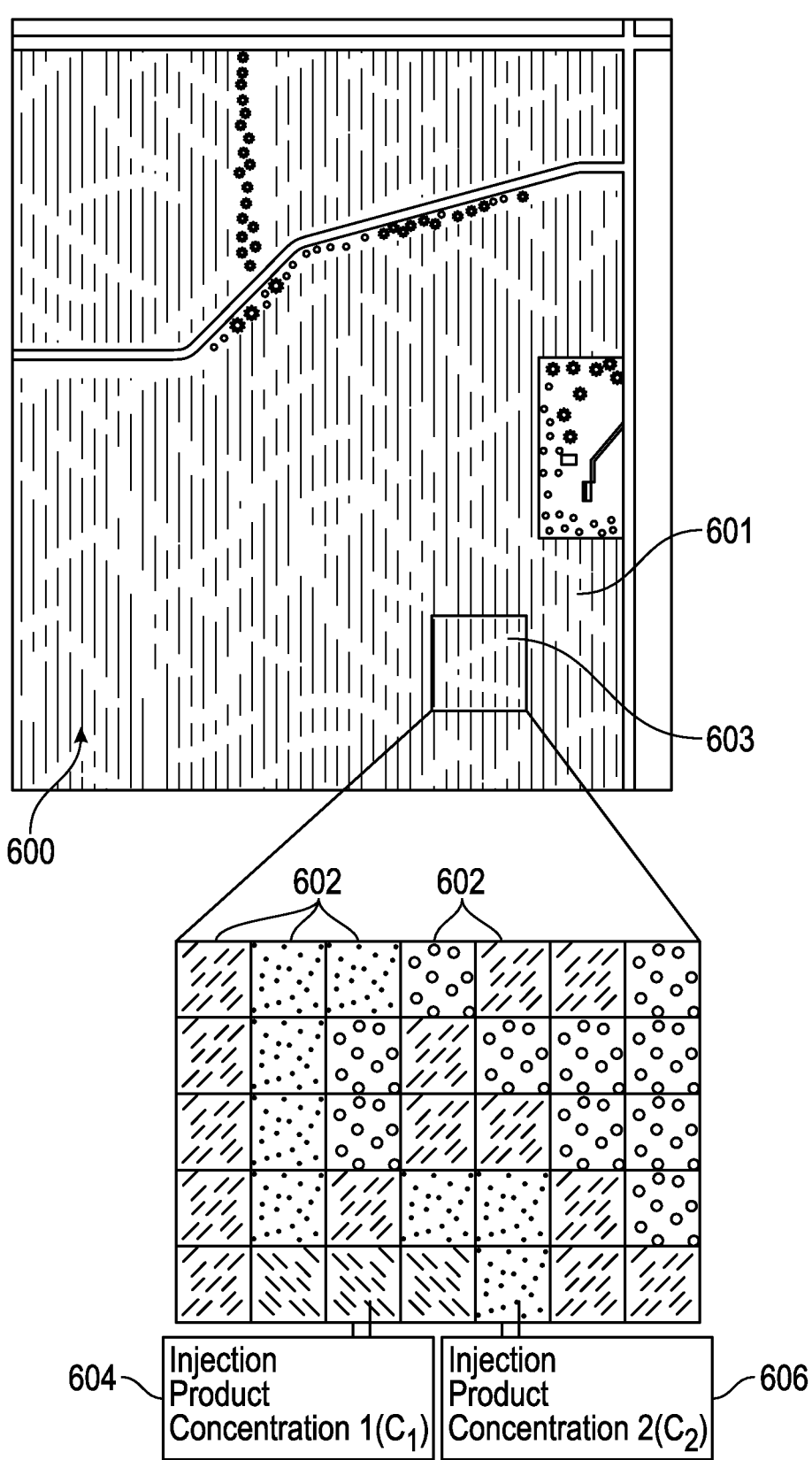
FIG. 6 is top view of one example of a field map including a plurality of zones indexed with concentration values for the injection product.

FIG. 6 shows one example of a field 601 including at least one subdivision such as a field section 603. The field section 603 is enlarged in the detailed view provided immediately below the field 601. As shown in the detailed view of the field section 603, the field section is divided into a plurality of zones 602. Two exemplary zones 604, 606 are provided. As shown, each of the zones 604, 606 has a corresponding stippling, crosshatching or the like denoting a particular concentration of an injection product for an agricultural product (e.g., for a fungicide, herbicide, pesticide, fertilizer or the like). In one example, the zones 602 of the field 601 are indexed to a field map 600. The field map 600 including the zones 602 provides a consolidated series of prescriptions for application of the agricultural product with varying concentrations of an injection product therein.

As previously described, the field map 600 is accessed by the field computer 508 and the injection control module 500. Optionally, the injection control module 500 accesses the field map 600 directly. As described herein, as one or more of the product dispensers 107 (e.g., boom sections 108 or nozzle assemblies 110) is within or is poised to enter one of the zones 602, for instance zone 604 or zone 606, the injection control module uses the prescription for the agricultural product for that zone to control the concentration of the injection product for the corresponding product dispensers 107. Accordingly, prior to entering the zone, while entering the zone, or while within the zone the injection control module 500 (e.g., the injection interface selection module 504) selects the relevant injection interfaces 120 corresponding to the product dispensers 107. The rate control module 502 uses the prescriptions provided in the field map 510 (e.g., zones 604, 606) to accordingly signal the interface valves 212 with the flow rates of the injection product corresponding to the specified concentration of the injection product. The injection product is then instantaneously delivered to the carrier fluid flow at the product dispensers 107 to ensure timely delivery of the injection product into the carrier system for corresponding delivery of the agricultural product (with the specified concentration of injection product) to the instant zone 602 of the field 601.

Accordingly, the sprayer 100 described herein including for instance the localized product injection system 112 (described in examples shown in FIGS. 2A through 3B), is configured to provide instantaneous individualized control of injection product concentration at each of a plurality of product dispensers 107. The injection product is immediately and locally distributed to the respective product dispensers 107 immediately prior to the desired application of the agricultural product.

As previously described herein, because the localized product injection system 112 is isolated from the carrier system 103, excepting the injection ports 216, 308 (see FIGS. 2B, 3B), even in low flow conditions of the carrier fluid through the carrier system 103 the injection product is still delivered at pressure and with the desired independently controlled concentrations to the corresponding product dispensers 107. Lag time that would otherwise delay the introduction of the injection product with the desired concentration is accordingly mitigated or eliminated even in low flow conditions because of the immediate introduction at the product dispensers 107.

FIG. 7 shows one example of a method 700 for using a localized product injection system, such as the system 112 described herein. In describing the method 700 reference is made to one or more components, features, functions and the like described herein. Where convenient reference is made to the components and features with reference numerals. Reference numerals provided are exemplary and are not exclusive. For instance, the features, components, functions and the like described in the method 700 include but are not limited to the corresponding numbered elements, other corresponding features described herein, both numbered and unnumbered as well as their equivalents.

At 702, the method 700 includes pressurizing an injection product within a localized product injection system 112. The localized product injection system 112 includes one or more localized injection interfaces 120 and corresponding product dispensers 107. In one example and as shown for instance in FIGS. 2A and 2B the product dispensers 107 include, but are not limited to, boom sections 108. In another example, the product dispensers 107 include, but are not limited to, nozzle assemblies, such as the nozzle assemblies 110 shown for instance in FIGS. 3A and 3B.

At 704, a specified injection concentration is determined for one or more of the product dispensers 107. In one example, determining the specified injection concentration for the one or more product dispensers 107 includes determining an injection concentration for the corresponding injection interfaces 120 associated with those product dispensers 107. For instance and as described herein, the one or more product dispensers 107 pass through a plurality of zones such as the zones 604, 606 of a field map 600. In one example, the field map 600 and one or more of GPS positioning, mathematical algorithms, combinations of the same, or the like are assessed by an injection control module 500 to determine the locations of the corresponding product dispensers 107 relative to the zones 602. Concentrations of the injection product are indexed to each of the zones 602. As the product dispensers 107 enter, are poised to enter, or are within the zones 602 (e.g., exemplary zones 604, 606) the corresponding concentrations are associated with the product dispensers and the respective injection interfaces by the injection control module 500.

At 706, the method 700 includes operating one or more interface valves 212 of the injection interfaces 120 for the corresponding one or more product dispensers 107. Operating of the one or more interface valves 120 includes, at 708, injecting the injection product to a carrier fluid of a carrier system 103 at the one or more product dispensers 107 (e.g., at the boom sections 108 or nozzle assemblies 110). Operating the one or more interface valves 120 includes, at 710, instantaneously (e.g., near instantaneously or instantaneously) changing the injection concentration in the carrier flow to the specified injection concentration at the one or more product dispensers 107. At 712, the injecting and instantaneous change of the injection concentration occurs according to the positioning of the one or more interface valves 212 (of the injection interfaces 120) and the corresponding injection ports (216, 308) at the one or more product dispensers 107. Stated another way, by positioning the injection interfaces 120 at the product dispensers 107 the concentration of the injection product in the agricultural product is immediately changed prior to dispensing the resulting agricultural product from the sprayer 102.

In another example, the injection control module 500 independently controls the one or more injection interfaces as described herein. With the concentrations of the injection product associated with the one or more injection interfaces 120 (e.g., through use of a field map 600 having a plurality of zones 602), the injection control module 500 actuates the interface valves 212 of the corresponding injection interfaces 120 to independently provide flow of the injection product to the product dispensers 107 as prescribed.

Several options for the method 700 follow. In one example, pressurizing the injection product includes pressurizing the injection product to each of the one or more localized injection interfaces 120 positioned at the one or more product dispensers 107. Stated another way and as described herein, the localized product injection system 112 is isolated from the carrier system 103 and interfaces with the carrier system at the injection interfaces 120 (local to the product dispensers 107). By maintaining a pressurized environment at the injection interfaces 120 the injection product is instantaneously injected into the carrier flow at the product dispensers 107. Accordingly, the pressurized system 112 separate from the carrier system 103 ensures the injection product is instantaneously delivered to the carrier fluid to accordingly provide agricultural product at the one or more product dispensers 107 having the desired concentration of the injection product with little to no lag time between injection and application. As stated herein by providing the injection interfaces 120 at the product dispensers 107 (as opposed to upstream near the carrier reservoir 104) the agricultural product having the specified injection concentration is immediately applied through the product dispensers 107, for instance the boom sections 108 and the nozzle assemblies 110. Stated another way, lag time otherwise present with upstream mixing of the injection product into a flow of the carrier fluid is avoided. Instead, the instantaneous injection and corresponding instantaneous change in concentration of the injection product within the carrier fluid generates an agricultural product having the desired injection concentration immediately prior to its application to the agricultural crop.

In still another example, the method 700 includes measuring the injection concentration in the agricultural product (carrier fluid) at the one or more product dispensers 107. For instance, in one example the product dispensers 107 include corresponding concentration sensors 512 (see FIG. 5). A flow rate of the injection product is changed or controlled according to the measured injection concentration and the specified injection concentration. For instance where the injection control module 500 specifies a desired injection product concentration (having a corresponding flow rate) the concentration sensor 512 communicates with the injection control module 500 to provide feedback control to accordingly tune the concentration to achieve the specified injection concentration specified by the rate control module 502.

In another example, operating the one or more interface valves 212 includes individually operating the one or more interface valves 212 (e.g., independently or as arrays). For instance, as described herein and shown for instance in FIGS. 5, 2B and 3B the injection interfaces 120 are independently operable relative to the other injection interfaces 120 of the sprayer 100. Accordingly, the localized product injection system 112 provides varying flow rates of the injection product to each of the product dispensers 107 according to individualized specified concentrations. In one example, the individualized specified concentrations are provided by the injection control module 500 configured to assess and determine injection product concentrations from a field map 510 having one or more varying prescriptions for the agricultural product.

VARIOUS NOTES & EXAMPLES

Example 1 can include subject matter such as can include a localized product injection system for use with a product dispensing system, the localized product injection system comprising: a product injection reservoir including an injection product; an injection header coupled with the product injection reservoir; one or more injection boom tubes coupled with the injection header; and a plurality of localized injection interfaces each configured for coupling at a corresponding product dispenser of a plurality of product dispensers, the plurality of localized injection interfaces in communication with the one or more injection boom tubes, each of the plurality of localized injection interfaces includes: an interface valve, an injection port in communication with the interface valve, the injection port configured for localized coupling and injection to the corresponding product dispenser, and wherein the plurality of localized injection interfaces are remote from the product injection reservoir and at the plurality of product dispensers.

Example 2 can include, or can optionally be combined with the subject matter of Example 1, to optionally include an injection control module, the injection control module operates each of the interface valves of the plurality of localized injection interfaces.

Example 3 can include, or can optionally be combined with the subject matter of one or any combination of Examples 1 or 2 to optionally include wherein the injection control module independently operates one or more of the interface valves of the plurality of localized injection interfaces.

Example 4 can include, or can optionally be combined with the subject matter of one or any combination of Examples 1-3 to optionally include wherein the interface valve includes a control valve configured to control an injection flow rate of the injection product to the corresponding product dispenser.

Example 5 can include, or can optionally be combined with the subject matter of one or any combination of Examples 1-4 optionally to include wherein the corresponding product dispenser includes a boom section, and the injection port of one or more of the plurality of localized injection interfaces is configured for coupling with the boom section.

Example 6 can include, or can optionally be combined with the subject matter of Examples 1-5 to optionally include wherein the corresponding product dispenser includes a boom section, and two or more injection ports of the plurality of localized injection interfaces are configured for coupling with opposed ends of the boom section.

Example 7 can include, or can optionally be combined with the subject matter of Examples 1-6 to optionally include wherein the corresponding product dispenser includes a nozzle assembly, and the injection port of one or more of the plurality of localized injection interfaces is configured for coupling with the nozzle assembly, the nozzle assembly in communication with a boom section.

Example 8 can include, or can optionally be combined with the subject matter of Examples 1-7 to optionally include wherein the corresponding product dispenser includes one or more of a boom section or a nozzle assembly.

Example 9 can include, or can optionally be combined with the subject matter of Examples 1-8 to optionally include wherein the interface valve is adjacent to the injection port, the interface valve controls the injection of the injection product to the corresponding product dispenser.

Example 10 can include, or can optionally be combined with the subject matter of Examples 1-9 to optionally include wherein the injection port includes an atomizer configured to mix the injection product into a carrier flow in the corresponding product dispenser.

Example 11 can include, or can optionally be combined with the subject matter of Examples 1-10 to optionally include wherein the injection port is configured for coupling with the corresponding product dispenser upstream from a mixing device.

Example 12 can include, or can optionally be combined with the subject matter of Examples 1-11 to optionally include an injection pump coupled with the production injection reservoir and the injection header, the injection pump configured to pressurize the injection product within the one or more injection boom tubes from the pump to the plurality of localized injection interfaces at the plurality of product dispensers.

Example 13 can include, or can optionally be combined with the subject matter of Examples 1-12 to optionally include a carrier system including: a carrier product reservoir including a carrier product, a header coupled with the carrier product reservoir, one or more boom tubes, and a plurality of product dispensers; and wherein the injection product is pressurized and isolated from the carrier product reservoir, the header and the one or more boom tubes, and the injection product is selectively introduced to the plurality of product dispensers with the plurality of localized injection interfaces at the plurality product dispensers.

Example 14 can include, or can optionally be combined with the subject matter of Examples 1-13 to optionally include a localized product injection system comprising: one or more injection boom tubes; a plurality of localized injection interfaces coupled with the one or more injection boom tubes, the plurality of localized injection interfaces configured for coupling with a plurality of product dispensers, each of the injection interfaces includes: an interface valve, an injection port in communication with the interface valve, the injection port configured for communication with a corresponding product dispenser of the plurality of product dispensers, and wherein the interface valve and the injection port are configured for positioning at the product dispenser; and wherein the plurality of localized injection interfaces maintain a controlled pressurized environment of an injection product through the localized product injection system to the plurality of product dispensers.

Example 15 can include, or can optionally be combined with the subject matter of Examples 1-14 to optionally include wherein the interface valve and the injection port of each of the plurality of localized injection interfaces are immediately adjacent to each other.

Example 16 can include, or can optionally be combined with the subject matter of Examples 1-15 to optionally include wherein the interface valve and the injection port of each of the plurality of localized injection interfaces are immediately adjacent to the corresponding product dispensers of the plurality of product dispensers.

Example 17 can include, or can optionally be combined with the subject matter of Examples 1-16 to optionally include an injection control module in communication with the interface valve of each of the plurality of localized injection interfaces, the injection module operates one or more of the interface valves to control the localized injection of the injection product at one or more product dispensers of the plurality of product dispensers.

Example 18 can include, or can optionally be combined with the subject matter of Examples 1-17 to optionally include wherein operation of the one or more interface valves with the injection control module instantaneously injects the injection product into the one or more product dispensers according to the interface valve and the injection port configured for positioning at the product dispenser.

Example 19 can include, or can optionally be combined with the subject matter of Examples 1-18 to optionally include wherein the injection control module includes a rate module, the rate module controls a rate of injection of the injection product at the one or more product dispensers of the plurality of product dispensers.

Example 20 can include, or can optionally be combined with the subject matter of Examples 1-19 to optionally include concentration sensors in communication with the injection control module, the concentration sensors configured for coupling with each of the plurality of product dispensers downstream from the respective injection ports of the plurality of localized injection interfaces.

Example 21 can include, or can optionally be combined with the subject matter of Examples 1-20 to optionally include wherein the injection control module operates the one or more interface valves according to injection product concentrations measured by the concentration sensors associated with the respective one or more interface valves.

Example 22 can include, or can optionally be combined with the subject matter of Examples 1-21 to optionally include wherein the injection control module individually controls operation of the interface valves of the plurality of localized injection interfaces.

Example 23 can include, or can optionally be combined with the subject matter of Examples 1-22 to optionally include wherein the injection control module includes an injection interface selection module, the injection interface section module selects one or more localized injection interfaces of the plurality of localized injection interfaces for operation of the respective interface valves.

Example 24 can include, or can optionally be combined with the subject matter of Examples 1-23 to optionally include wherein the injection control module includes a field computer interface configured to couple with a field computer, the field computer determines the locations of one or more of the plurality of product dispensers on a field map, and the injection interface selection module selects the one or more localized injection interfaces according to the determined locations, and a rate module of the injection control module controls a rate of injection of the injection product at the one or more selected localized injection interfaces according to the determined locations.

Example 25 can include, or can optionally be combined with the subject matter of Examples 1-24 to optionally include a method for using a localized product injection system comprising: pressurizing an injection product within the localized product injection system, the injection product pressurized at least at one or more localized injection interfaces positioned at corresponding product dispensers of one or more product dispensers; determining a specified injection concentration for the one or more product dispensers; and operating one or more interface valves of the one or more localized injection interfaces for the one or more product dispensers, operating including: injecting the injection product to a carrier flow at the one or more product dispensers according to the pressurizing at the one or more localized injection interfaces, instantaneously changing an injection concentration in the carrier flow to the specified injection concentration at the one or more product dispensers according to the injecting, and wherein injecting and instantaneously changing the injection concentration occurs according to the positioning of the one or more interface valves and injection ports of the one or more localized injection interfaces at the one or more product dispensers.

Example 26 can include, or can optionally be combined with the subject matter of Examples 1-25 to optionally include wherein pressurizing the injection product includes pressurizing the injection product to each of the one or more localized injection interfaces positioned at the one or more product dispensers.

Example 27 can include, or can optionally be combined with the subject matter of Examples 1-26 to optionally include dispensing the carrier flow with the specified injection concentration from the one or more product dispensers immediately after injection and instantaneous change of the injection concentration.

Example 28 can include, or can optionally be combined with the subject matter of Examples 1-27 to optionally include measuring the injection concentration in the carrier flow at the one or more product dispensers; and controlling a rate of injection of the injection product according to the measured injection concentration and the specified injection concentration.

Example 29 can include, or can optionally be combined with the subject matter of Examples 1-28 to optionally include wherein operating one or more interface valves includes individually operating the one or more interface valves.

Example 30 can include, or can optionally be combined with the subject matter of Examples 1-29 to optionally include determining locations of each of the one or more product dispensers on a field map.

Example 31 can include, or can optionally be combined with the subject matter of Examples 1-30 to optionally include wherein determining the specified injection concentration for one or more product dispensers includes determining the specified injection concentration according to the injection concentrations associated with the determined locations on the field map; and operating the one or more interface valves includes operating the one or more interface valves according to the determined locations and the associated injection concentrations.

Example 32 can include, or can optionally be combined with the subject matter of Examples 1-31 to optionally include wherein operating the one or more interface valves includes selecting the one or more interface valves for operation based on the determined locations of the one or more product dispensers.

Example 33 can include, or can optionally be combined with the subject matter of Examples 1-32 to optionally include wherein the one or more product dispensers include one or more nozzle assemblies.

Example 34 can include, or can optionally be combined with the subject matter of Examples 1-33 to optionally include wherein the one or more product dispensers include one or more boom sections.

Example 35 can include, or can optionally be combined with the subject matter of Examples 1-34 to optionally include wherein one or more of injecting or instantaneously changing the injection concentration includes mixing the injection product with the carrier flow at the one or more product dispensers.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A localized product injection system for use with an agricultural sprayer, the localized product injection system comprising:

a localized injection interface configured for coupling at a product dispenser of an agricultural sprayer and configured for communication with an injection boom tube having an injection product downstream from the injection boom tube, the localized injection interface includes:

an interface control valve configured to control a flow rate of the injection product to a carrier fluid at the product dispenser, the injection product and carrier fluid mix at the product dispenser to form an agricultural product; and a concentration sensor interposed between the interface control valve and the product dispenser, the concentration sensor configured to determine an injection product concentration in the agricultural product at the product dispenser independently relative to other injection product concentrations at other product dispensers; and an injection control module in communication with the interface control valve, and the injection control module is configured to:

compare the determined injection product concentration to a specified injection product concentration; and graduate a flow rate of the injection product at the product dispenser with the interface control valve based on the comparison, wherein graduation of the flow rate of the injection product is independent relative to other product dispensers.

2. The localized product injection system of claim 1, wherein the injection control module is configured to control graduation of the flow rate of the injection product based on the comparison of the determined injection product concentration to the specified injection product concentration with feedback control.

3. The localized product injection system of claim 1, wherein the concentration sensor includes a light sensor configured to measure injection product concentration based on one or more of color or translucency of the agricultural product.

4. The localized product injection system of claim 1, wherein the concentration sensor includes a pH sensor configured to determine injection product concentration based on one or more of alkalinity or acidity of the agricultural product.

5. The localized product injection system of claim 1 comprising the product dispenser.

6. The localized product injection system of claim 5, wherein the product dispenser includes a nozzle assembly having a nozzle and a mixer interposed between the nozzle and the interface control valve.

7. The localized product injection system of claim 1, wherein the product dispenser includes a nozzle assembly having a nozzle.

8. The localized product injection system of claim 1, wherein the product dispenser includes a boom section having a plurality of nozzle assemblies.

9. The localized product injection system of claim 1 comprising:

a carrier fluid reservoir including the carrier fluid;

one or more boom tubes in communication with the carrier fluid reservoir;

an injection product reservoir including the injection product;

an injection boom tube in communication with the injection product reservoir;

a plurality of product dispensers, each of the product dispensers having the localized injection interface, respectively, and each of the product dispensers is in communication with the one or more boom tubes and the injection boom tube with the respective localized injection interface.

10. A localized product injection system for use with an agricultural sprayer, the localized product injection system comprising:

a carrier fluid reservoir configured to hold a carrier fluid;

an injection product reservoir configured to hold an injection product;

a plurality of product dispensers in communication with the carrier fluid reservoir with one or more boom tubes and the injection product reservoir with an injection boom tube; a plurality of localized injection interfaces coupled at respective product dispensers of the plurality of product dispensers downstream from the one or more boom tubes and the injection boom tube, each localized injection interface includes:

an interface control valve configured to control a flow rate of the injection product to the carrier fluid at the product dispenser to form an agricultural product, the interface control valve in communication with the injection boom tube;

a concentration sensor interposed between the interface control valve and the product dispenser, the concentration sensor configured to determine an injection product concentration of the injection product in the agricultural product at the respective product dispenser of the plurality of product dispensers relative to the injection product concentration at other product dispensers of the plurality of product dispensers; and wherein the localized injection interface is configured to isolate the one or more boom tubes from the injection product and inject the injection product to the carrier fluid to form an agricultural product at the product dispenser; and an injection control module in communication with the interface control valve, and the injection control module is configured to:

compare the determined injection product concentration to a specified injection product concentration; and graduate a flow rate of the injection product to the carrier fluid at the product dispenser with the interface control valve based on the comparison, wherein graduating the flow rate of the injection product at the product dispenser is relative to graduating a flow rate at the other product dispensers of the plurality of product dispensers.

11. The localized product injection system of claim 10, wherein the injection control module is configured to control graduation of the flow rate of the injection product based on the comparison of the determined injection product concentration to the specified injection product concentration with feedback control.

12. The localized product injection system of claim 10, wherein the concentration sensor includes a light sensor configured to determine injection product concentration based on one or more of color or translucency of the agricultural product.

13. The localized product injection system of claim 10, wherein the concentration sensor includes a pH sensor configured to measure injection product concentration based on one or more of alkalinity or acidity of the agricultural product.

14. The localized product injection system of claim 10, wherein the product dispenser includes a nozzle assembly having a nozzle.

15. The localized product injection system of claim 14, wherein the product dispenser includes a mixer interposed between the nozzle and the interface control valve.

16. The localized product injection system of claim 10, wherein the product dispenser includes a boom section having a plurality of nozzle assemblies.

17. A method for injecting an injection product in an agricultural sprayer, the method comprising:

delivering a carrier fluid through a boom tube to a product dispenser;

delivering an injection product through an injection boom tube to the product dispenser, the carrier fluid and the injection product isolated from each other;

injecting the injection product to the carrier fluid to form an agricultural product at the product dispenser with a localized injection interface, injecting includes:

determining an injection product concentration in the agricultural product at the product dispenser with a concentration sensor interposed between the interface control valve and the product dispenser, wherein determining the injection product concentration includes determining the injection product concentration relative to other injection product concentrations at other product dispensers;

comparing the determined injection product concentration at the product dispenser to a specified injection product concentration; and operating an interface control valve at the product dispenser to graduate a flow rate of the injection product to the carrier fluid at the product dispenser according to the comparison, wherein operating the interface control valves includes graduating the flow rate of the injection product independently relative to other product dispensers.

18. The method of claim 17, wherein the product dispenser includes a nozzle assembly having a nozzle; and comprising spraying the agricultural product with the determined injection product concentration from the nozzle of the product dispenser.

19. The method of claim 18, wherein spraying the agricultural product includes spraying the agricultural product with the determined injection product immediately after injecting the injection product to the carrier fluid.

20. The method of claim 17, wherein injecting the injection product to the carrier fluid includes operating the interface control valve at the product dispenser based on the comparison of the determined injection product concentration to the specified injection product concentration with feedback control.

21. The method of claim 17, wherein measuring the injection product concentration includes measuring one or more of color or translucency of the agricultural product.

22. The method of claim 17, wherein measuring the injection product concentration includes measuring one or more of alkalinity or acidity of the agricultural product.

* * * * *